United States Patent
Smith et al.

(10) Patent No.: US 11,747,893 B2
(45) Date of Patent: Sep. 5, 2023

(54) VISUAL COMMUNICATIONS METHODS, SYSTEMS AND SOFTWARE

(71) Applicant: MINE ONE GmbH, Berlin (DE)

(72) Inventors: Brian W. Smith, San Francisco, CA (US); James A. McCombe, San Francisco, CA (US); Christoph Birkhold, San Francisco, CA (US)

(73) Assignee: MINE ONE GMBH, Berlin (DE)

( * ) Notice: Subject to any disclaimer, the term of this patent is extended or adjusted under 35 U.S.C. 154(b) by 387 days.

(21) Appl. No.: 16/642,324

(22) PCT Filed: Aug. 27, 2018

(86) PCT No.: PCT/US2018/048197
§ 371 (c)(1),
(2) Date: Feb. 26, 2020

(87) PCT Pub. No.: WO2019/067134
PCT Pub. Date: Apr. 4, 2019

(65) Prior Publication Data
US 2021/0072822 A1 Mar. 11, 2021

Related U.S. Application Data

(63) Continuation-in-part of application No. PCT/US2016/023433, filed on Mar. 21, 2016, and a
(Continued)

(51) Int. Cl.
*G06F 3/01* (2006.01)
*H04N 13/254* (2018.01)
(Continued)

(52) U.S. Cl.
CPC ............. *G06F 3/012* (2013.01); *G06F 3/013* (2013.01); *G06F 3/04815* (2013.01); *G06T 7/50* (2017.01);
(Continued)

(58) Field of Classification Search
CPC ...... G06F 3/012; G06F 3/013; G06F 3/04815; G06T 7/50; G06T 11/00;
(Continued)

(56) References Cited

U.S. PATENT DOCUMENTS 8,547,374 B1    10/2013  Sadjadi
9,609,305 B1 *   3/2017  Ramaswamy ....... H04N 13/239
(Continued)

OTHER PUBLICATIONS

Hoppe et al., "Online Feedback for Structure-From-Motion Image Acquisition", Proc. of British Machine Vision Conf., Jan. 1, 2012, pp. 70.1-70.12.
(Continued)

*Primary Examiner* — Nasim N Nirjhar
(74) *Attorney, Agent, or Firm* — JACOBS & KIM LLP; David Jacobs

(57) ABSTRACT

Methods, systems, devices and computer software/program code products enable efficient handling and remedying of unreliable sensor data, such as data captured by cameras in a virtual 3-dimensional (V3D) imaging or communications system; and enable, in a visual communications system involving a plurality of display devices usable by respective users, synchronization to a common space, and display of images by a receiving device in an orientation independent of the angle at which the receiving device is held.

16 Claims, 21 Drawing Sheets

Related U.S. Application Data continuation of application No. 15/560,019, filed as application No. PCT/US2016/023433 on Mar. 21, 2016, now Pat. No. 10,551,913.

(60) Provisional application No. 62/550,685, filed on Aug. 27, 2017, provisional application No. 62/136,494, filed on Mar. 21, 2015.

(51) Int. Cl.
| | | |
|---|---|---|
| *H04N 13/117* | (2018.01) | |
| *H04N 13/239* | (2018.01) | |
| *H04N 13/243* | (2018.01) | |
| *H04N 7/14* | (2006.01) | |
| *H04N 7/18* | (2006.01) | |
| *H04N 23/80* | (2023.01) | |
| *G06T 7/50* | (2017.01) | |
| *H04N 13/344* | (2018.01) | |
| *G06F 3/04815* | (2022.01) | |
| *G06T 11/00* | (2006.01) | |
| *H04N 13/271* | (2018.01) | |
| *H04N 5/33* | (2023.01) | |
| *H04N 13/00* | (2018.01) | |

(52) U.S. Cl.
CPC .............. *G06T 11/00* (2013.01); *H04N 7/147* (2013.01); *H04N 7/18* (2013.01); *H04N 13/117* (2018.05); *H04N 13/239* (2018.05); *H04N 13/243* (2018.05); *H04N 13/254* (2018.05); *H04N 13/344* (2018.05); *H04N 23/80* (2023.01); *G06T 2207/10048* (2013.01); *H04N 5/33* (2013.01); *H04N 13/271* (2018.05); *H04N 2013/0081* (2013.01)

(58) Field of Classification Search
CPC .......... G06T 2207/10048; G06V 10/40; G06V 20/13; H04N 5/23229; H04N 7/147; H04N 7/18; H04N 13/117; H04N 13/239; H04N 13/243; H04N 13/254; H04N 13/344; H04N 5/33; H04N 13/271; H04N 2013/0081
See application file for complete search history.

(56) References Cited

U.S. PATENT DOCUMENTS

| | | | |
|---|---|---|---|
| 2007/0254640 | A1 | 11/2007 | Bliss |
| 2011/0306422 | A1* | 12/2011 | Nishimoto ............ G06F 3/0304 |
| | | | 345/473 |
| 2012/0133779 | A1* | 5/2012 | Ma ..................... G06V 10/7715 |
| | | | 382/164 |
| 2012/0200669 | A1* | 8/2012 | Lai ....................... H04N 13/128 |
| | | | 348/43 |
| 2012/0249750 | A1 | 10/2012 | Izzat |
| 2013/0201301 | A1 | 8/2013 | Huang |
| 2013/0215107 | A1 | 8/2013 | Kimura et al. |
| 2013/0278633 | A1 | 10/2013 | Ahn et al. |
| 2014/0267243 | A1 | 9/2014 | Venkataraman et al. |
| 2014/0270480 | A1 | 9/2014 | Boardman |
| 2016/0342832 | A1 | 11/2016 | Bud et al. |
| 2017/0017302 | A1* | 1/2017 | Libal ..................... G06F 3/0304 |
| 2017/0046025 | A1* | 2/2017 | Dascola ............ H04M 1/72436 |
| 2017/0085733 | A1 | 3/2017 | Ilic |
| 2017/0094243 | A1 | 3/2017 | Venkataraman et al. |
| 2017/0244960 | A1* | 8/2017 | Ciurea ................ H04N 17/002 |

OTHER PUBLICATIONS

Berge et al., "Real-time Uncertainty Visualization for B-mode Ultrasound", 2015 IEEE Scientific Visualization Conf., Oct. 25, 2015, pp. 33-40.

* cited by examiner

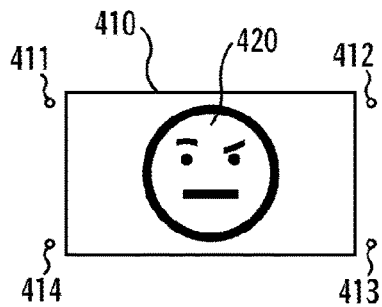
FIG. 4A
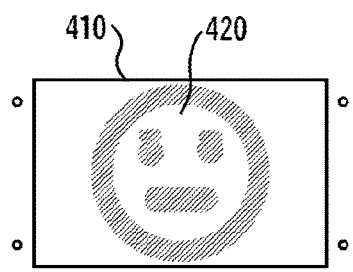
FIG. 4B
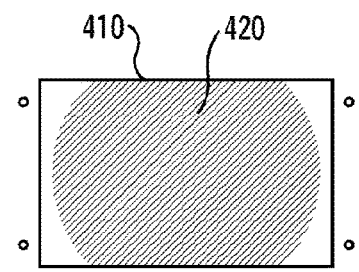
FIG. 4C
FIG. 5
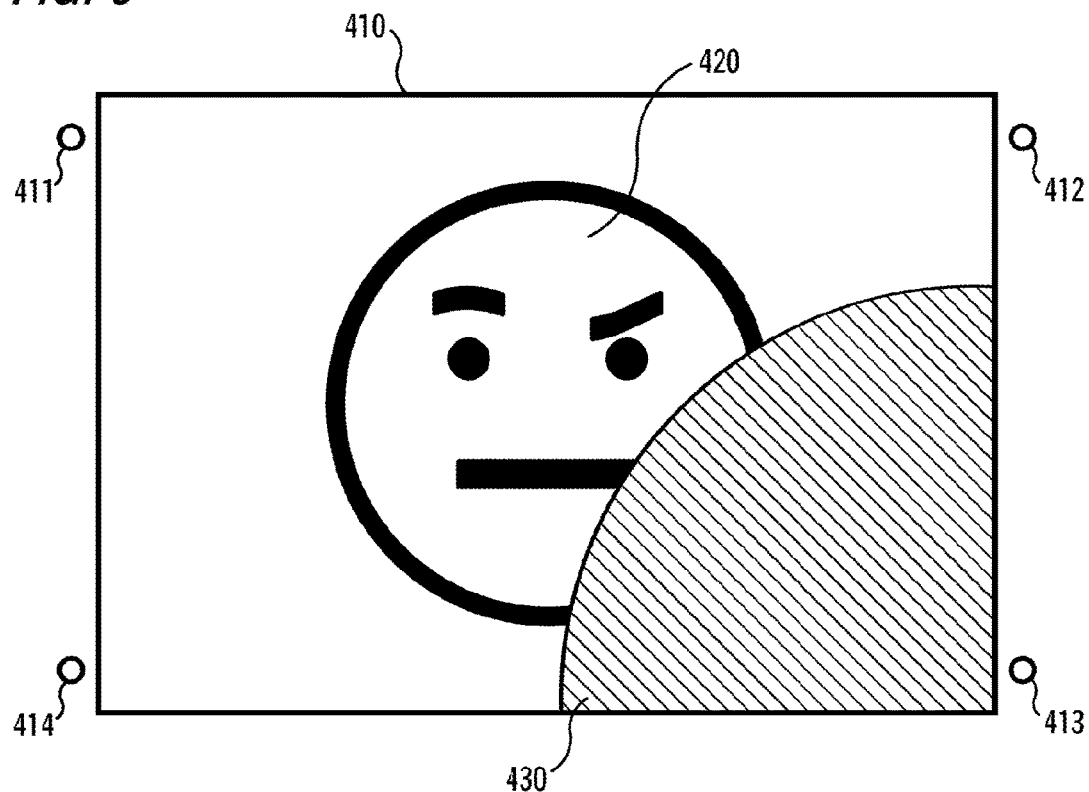

800.

801. RECEIVE SENSOR DATA FROM AT LEAST ONE SENSOR, THE DATA BEING AT LEAST IN PART REPRESENTATIVE OF A SCENE (801.1 SENSORS CAN COMPRISE AT LEAST ONE STEREO PAIR OF CAMERAS)

(801.2 SENSORS CAN BE ASSOCIATED WITH OR PART OF A CAPTURING DEVICE)

802. DETECT OR EVALUATE THE RELIABILITY OF THE SENSOR DATA, THEREBY GENERATING RELIABILITY INFORMATION
(802.1 DETECTING THE RELIABILITY CAN INCLUDE UTILIZING A HEURISTIC)
(802.2 DETECTING CAN INCLUDE COMPARING OUTPUT OF A SENSOR TO OUTPUT OF OTHER SENSOR(S))
(802.3 SUB-SECTIONS OF OUTPUT CAN BE COMPARED INDEPENDENTLY)
(802.4 THE COMPARING CAN UTILIZE AT LEAST ONE HISTOGRAM)
(802.5 THE HISTOGRAMS CAN PERTAIN TO DEPTH DATA, STEREO DISPARITY DATA, AND/OR OTHER DATA)
(802.6 THE COMPARING CAN INVOLVE GENERATING AN AVERAGE)
(802.7 THE COMPARING CAN INVOLVE COMPARING LUMINANCE DATA FROM ONE OR MORE CAMERAS)
(802.8 THE COMPARING CAN INVOLVE COMPARING COLOR DATA FROM ONE OR MORE CAMERAS)
(802.9 IDENTIFY INVALID PATTERNS IN THE RECEIVED DATA)

803. DETERMINE WHETHER AT LEAST ONE SENSOR IS OCCLUDED

804. REMEDY THE UNRELIABLE SENSOR DATA TO GENERATE REMEDIED DATA
(804.1 THE REMEDYING CAN INCLUDE EXCLUDING UNRELIABLE DATA)
(804.2 REMEDYING CAN INCLUDE REDUCING CONTRIBUTION FROM UNRELIABLE SENSOR DATA INTO RICH SCENE INFO)
(804.3 THE REMEDYING CAN INCLUDE NOTIFYING A USER OF UNRELIABLE DATA)
(804.4 NOTIFYING THE USER OF UNRELIABLE DATA CAN BE THROUGH A DISPLAY)
(804.5 THE DISPLAY CAN BE PART OF A DEVICE CONTAINING THE DISPLAY AND AT LEAST ONE SENSOR)
(804.6 REMEDYING CAN INCLUDE PRESENTING INTUITIVE VISUAL CUES ON A DISPLAY, THAT TEND TO DIRECT THE USER TO ACT IN A MANNER TO RESOLVE A CONDITION CAUSING UNRELIABLE DATA)
(804.7 THE INTUITIVE VISUAL CUES CAN BE APPLIED TO A REGION OF AN IMAGE OF THE SCENE, THE REGION BEING ASSOCIATED WITH THE UNRELIABLE DATA)
(804.8 THE INTUITIVE VISUAL CUES CAN INCLUDE A VISUAL EFFECT)
(804.9 THE VISUAL EFFECT CAN BE APPLIED MORE STRONGLY IN RESPONSE TO GREATER UNRELIABILITY)
(804.10 THE VISUAL EFFECT CAN INCLUDE A BLUR EFFECT)

FIG. 8A continued from FIG. 8A

805. GENERATE RICH SCENE INFORMATION FROM (A) THE SENSOR DATA, INCLUDING REMEDIED DATA, AND (B) RELIABILITY INFORMATION (805.1 RICH SCENE INFORMATION CAN INCLUDE DEPTH INFORMATION)

(805.2 THE DEPTH INFORMATION CAN BE OBTAINED BY STEREO DISPARITY ANALYSIS)

806. TRANSMIT THE RICH SCENE INFORMATION TO A REMOTE DEVICE, THE REMOTE DEVICE BEING A DEVICE REMOTE FROM THE SCENE AND OPERABLE TO RECEIVE TRANSMITTED RICH SCENE INFO.

(806.1 AT LEAST ONE SENSOR IS ASSOCIATED WITH THE CAPTURING DEVICE, AND CAPTURING DEVICE IS OPERABLE TO TRANSMIT ANY OF SENSOR DATA AND RICH SCENE INFORMATION)
(806.2 REMOTE DEVICE CAN NOTIFY THE CAPTURING DEVICE OF UNRELIABLE TRANSMITTED DATA REPRESENTATIVE OF THE SCENE)
(806.3 CAPTURING DEVICE CAN PRESENT AN INDICATION OF UNRELIABLE TRANSMITTED DATA)
(806.4 REMOTE DEVICE CAN PRESENT AN INDICATION OF UNRELIABLE RECEIVED DATA)
(806.5 INDICATION OF UNRELIABLE DATA, PRESENTED BY CAPTURING DEVICE, CAN CORRELATE WITH INDICATION OF UNRELIABLE DATA PRESENTED BY REMOTE DEVICE)
(806.6 INDICATION OF UNRELIABLE DATA PRESENTED BY CAPTURING DEVICE IS CONFIGURED SO AS TO TEND TO DIRECT A USER OF THE CAPTURING DEVICE TO REMEDY AN OCCLUDED SENSOR)

807. RECONSTRUCT SCENE AS VIEWED FROM VIRTUAL VIEWPOINT, BASED ON RICH SCENE INFO.

FIG. 8B continued from FIG. 9A

905. USING RECEIVING DEVICE, CAPTURE DESTINATION ENVIRONMENTAL PARAMETERS

(905.1 RECEIVING DEVICE CAN TRANSMIT THE DESTINATION ENVIRONMENTAL PARAMETERS TO THE TRANSMITTING DEVICE(S))

906. USING RECEIVING DEVICE, RECEIVE THE RICH SCENE INFORMATION FROM THE AT LEAST ONE TRANSMITTING DEVICE

907. USING RECEIVING DEVICE, INTERPRET THE RICH SCENE INFORMATION

(907.1 INTERPRETING CAN INCLUDE DATA DECOMPRESSION)

(907.2 INTERPRETING CAN INCLUDE ROTATING OR TRANSFORMING THE RICH SCENE INFORMATION WITH RESPECT TO AN ORIENTATION VECTOR)

908. USING RECEIVING DEVICE, PRESENT SCENE, BASED AT LEAST IN PART ON RICH SCENE INFORMATION

(908.1 PRESENTING COMPRISES DISPLAYING AT LEAST ONE IMAGE OF SCENE, VIA DISPLAY ELEMENT OPERABLE TO COMMUNICATE WITH RECEIVING DEVICE, BASED AT LEAST IN PART ON RICH SCENE INFORMATION)

(908.2 RECEIVING DEVICE UTILIZES THE ORIGINATING ENVIRONMENTAL PARAMETERS, TRANSMITTED TO THE RECEIVING DEVICE BY THE TRANSMITTING DEVICE, IN PRESENTING THE SCENE)

(908.3 AT LEAST ONE DEVICE ROTATES OR TRANSFORMS THE SCENE INFORMATION)

(908.4 THE RECEIVING DEVICE CAN PRESENT THE SCENE WITH A CONSISTENT DOWNWARD ORIENTATION THAT IS SUBSTANTIALLY ALIGNED WITH A SELECTED AXIS OF THE TRANSMITTING DEVICE OR DEVICES, IRRESPECTIVE OF THE ROTATION OF THE DEVICES)

(908.5 RECEIVING DEVICE CAN PRESENT AT LEAST ONE IMAGE OF SCENE TO USER, BY PRESENTING IT ON A DISPLAY ELEMENT (HEAD MOUNTED DISPLAY (HMD), DISPLAY ELEMENT ON HAND-HELD DEVICE, DESKTOP DISPLAY SCREEN, WALL-MOUNTED DISPLAY, FREESTANDING DISPLAY, SURFACE MOUNTED DISPLAY, OUTDOOR DISPLAY SCREEN OR OTHER DISPLAY ELEMENT))

(908.6 THE TRANSMITTING DEVICE CAN FURTHER COMPRISE A FEEDBACK VIEW THAT PRESENTS FEEDBACK TO A USER OF TRANSMITTING DEVICE)

(908.7 FEEDBACK CAN COMPRISE AN IMAGE OF THE SCENE)

(908.8 THE RECEIVING DEVICE CAN PRESENT A DIFFERENT PORTION OF THE SCENE FROM THE PORTION PRESENTED BY THE FEEDBACK VIEW OF THE TRANSMITTING DEVICE)

FIG. 9B

1000. ENVIRONMENTAL PARAMETERS/ORIENTATION VECTOR (1000.1 ORIGINATING ENVIRONMENTAL PARAMETERS COMPRISE PARAMETERS ASSOCIATED WITH THE SCENE)

(1000.2 ORIGINATING ENVIRONMENTAL PARAMETERS COMPRISE PARAMETERS ASSOCIATED WITH THE TRANSMITTING DEVICE)

(1000.3 DESTINATION ENVIRONMENTAL PARAMETERS COMPRISE PARAMETERS ASSOCIATED WITH THE ENVIRONMENT PROXIMATE THE RECEIVING DEVICE)

(1000.4 DESTINATION ENVIRONMENTAL PARAMETERS COMPRISE PARAMETERS ASSOCIATED WITH THE RECEIVING DEVICE)

(1000.5 ORIGINATING/DESTINATION ENVIRONMENTAL PARAMETERS CAN INCLUDE AN ORIENTATION VECTOR)

(1000.6 ORIENTATION VECTOR IS SUBSTANTIALLY CONSTRAINED WITH RESPECT TO GIVEN DEVICE, BUT CAN BE ALTERED IN RESPONSE TO SUBSTANTIAL CHANGE IN DATA FROM SPATIAL SENSOR)

(1000.7 A SPATIAL SENSOR CAN BE ANY OF ANY OF AN ACCELEROMETER, GYROSCOPE, COMPASS, GPS, OTHER SPATIAL SENSOR, OR COMBINATION OF SPATIAL SENSORS; AND ORIENTATION VECTOR CAN BE DETERMINED/MEASURED USING AN ACCELEROMETER, GYROSCOPE, COMPASS, GPS (GLOBAL POSITIONING SYSTEM), OTHER SPATIAL SENSOR, OR COMBINATION OF SPATIAL SENSORS)

(1000.8 AN ORIENTATION VECTOR IS PERMITTED TO MOVE TO ALIGN WITH THE ORIENTATION OF AN ASSOCIATED DEVICE IN A GRAVITY FIELD)

(1000.9 SYSTEM/METHOD CAN APPLY A SELECTED SMOOTHING PROCESS TO SMOOTH HIGH FREQUENCY CHANGES TO AN ORIENTATION VECTOR)

(1000.10 SYSTEM/METHOD CAN CONFIGURE CONTROL LOGIC TO BE OPERABLE TO APPLY SELECTED SMOOTHING PROCESS)

(1000.11 ORIENTATION VECTOR CAN BE AT LEAST IN PART CONTROLLED BY A USER THROUGH A USER INTERFACE)

(1000.12 ORIENTATION VECTOR CAN BE DERIVED FROM THE RICH SCENE INFORMATION)

(1000.13 THE INTERPRETING AND/OR THE PROCESSING UTILIZE ORIENTATION VECTORS FROM MORE THAN ONE DEVICE)

(1000.14 THE INTERPRETING AND/OR THE PROCESSING CAN USE THE DIFFERENCE BETWEEN ORIENTATION VECTORS FROM MORE THAN ONE DEVICE)

FIG. 10

1100. USER CONTROL (1100.1 ENABLE USER OF A RECEIVING DEVICE TO SELECT PORTION OF SCENE PRESENTED BY RECEIVING DEVICE)

(1100.2 ENABLE USER OF A RECEIVING DEVICE TO SELECT A GAZE DIRECTION TO CHANGE A VIRTUAL VIEWPOINT, THEREBY TO CONTROL VIEWPOINT OF SCENE PRESENTED BY RECEIVING DEVICE)

(1100.3 ENABLE USER OF TO SELECT GAZE DIRECTION BY UTILIZING A TOUCH SCREEN INTERFACE ASSOCIATED WITH RECEIVING DEVICE)

(1100.4 GAZE DIRECTION CAN BE CONTROLLED AT LEAST IN PART BY OUTPUT OF AN ACCELEROMETER, GYROSCOPE, COMPASS, GPS, OTHER SPATIAL SENSOR, OR COMBINATION OF SPATIAL SENSORS)

(1100.5 ENABLE USER OF RECEIVING DEVICE TO CONTROL GAZE DIRECTION BY EXECUTING A USER GESTURE OBSERVABLE BY NON-CONTACT SENSOR ASSOCIATED WITH RECEIVING DEVICE)

(1100.6 GAZE DIRECTION CAN BE CHANGED BY THE PHYSICAL POSITION OF A USER, RELATIVE TO A PHYSICAL POSITION OF A RECEIVING DEVICE)

(1100.7 USER OF RECEIVING DEVICE CAN CHANGE THE FOCUS OF A VIRTUAL CAMERA THAT DEFINES A PERSPECTIVE OF A DISPLAYED IMAGE OF SCENE)

(1100.8 FOCUS CAN BE CHANGED BY THE USER SELECTING A REGION OF A DISPLAYED IMAGE TO BRING INTO SHARP FOCUS)

(1100.9 ENABLE USER OF RECEIVING DEVICE TO CHANGE FOCUS BY EXECUTING A USER GESTURE OBSERVABLE BY NON-CONTACT SENSOR ASSOCIATED WITH A RECEIVING DEVICE)

(1100.10 ENABLE USER OF RECEIVING DEVICE TO CHANGE A FIELD OF VIEW OF A DISPLAYED IMAGE)

(1100.11 ENABLE USER OF RECEIVING DEVICE TO CHANGE FIELD OF VIEW BY EXECUTING USER GESTURE ON A TOUCH SCREEN ASSOCIATED WITH THE RECEIVING DEVICE)

(1100.12 FIELD OF VIEW IS CONTROLLABLE/CHANGEABLE BY MOTION OF A DEVICE, THE MOTION BEING DETECTED BY AN ACCELEROMETER, GYROSCOPE, COMPASS, GPS, OTHER SPATIAL SENSOR, OR COMBINATION OF SPATIAL SENSORS)

(1100.13 ENABLE USER TO CHANGE FIELD OF VIEW BY EXECUTING A USER GESTURE OBSERVABLE BY A NON-CONTACT SENSOR ASSOCIATED WITH RECEIVING DEVICE)

(1100.14 FIELD OF VIEW CAN BE CHANGED BY THE PHYSICAL POSITION OF A USER, RELATIVE TO THE PHYSICAL POSITION OF A RECEIVING DEVICE)

(1100.15 ENABLE USER OF A RECEIVING DEVICE TO CHANGE AN IMAGE ZOOM PARAMETER)

(1100.16 ENABLE USER OF RECEIVING DEVICE TO CHANGE ZOOM PARAMETER BY EXECUTING A USER GESTURE ON A TOUCH SCREEN ASSOCIATED WITH RECEIVING DEVICE)

(1100.17 ZOOM CAN BE CHANGED BY MOTION OF A DEVICE, THE MOTION BEING DETECTED BY AN ACCELEROMETER, GYROSCOPE, COMPASS, GPS, OTHER SPATIAL SENSOR, OR COMBINATION OF SPATIAL SENSORS)

(1100.18 ENABLE USER OF RECEIVING DEVICE TO CHANGE ZOOM PARAMETER BY EXECUTING A USER GESTURE OBSERVABLE BY A NON-CONTACT SENSOR ASSOCIATED WITH RECEIVING DEVICE)

(1100.19 ZOOM IS CONTROLLABLE BY THE PHYSICAL POSITION OF A USER, RELATIVE TO THE PHYSICAL POSITION OF A RECEIVING DEVICE)

FIG. 11

1200. SPATIAL TOPOLOGY / SCALING / TRANSMITTERS & RECEIVERS (1200.1 CONFIGURE RECEIVING DEVICE TO BE OPERABLE TO ATTEMPT TO PRESERVE THE SPATIAL TOPOLOGY OF THE SCENE CAPTURED BY THE AT LEAST ONE TRANSMITTING DEVICE)

(1200.2 AT LEAST ONE RECEIVING OR TRANSMITTING DEVICE IS OPERABLE TO APPLY A SCALE FACTOR TO THE RICH SCENE INFORMATION)

(1200.3 ENABLE USER TO MODIFY THE SCALE FACTOR VIA AN INTERFACE)

(1200.4 IN A PLURALITY OF RECEIVING DEVICES AND TRANSMITTING DEVICES, AT LEAST ONE RECEIVING DEVICE IS OPERABLE TO ADDITIONALLY FUNCTION AS A TRANSMITTING DEVICE, AND AT LEAST ONE TRANSMITTING DEVICE IS OPERABLE TO ADDITIONALLY FUNCTION AS A RECEIVING DEVICE)

(1200.5 IN A PLURALITY OF TRANSMITTING DEVICES AND RECEIVING DEVICES, SOME OF THE DEVICES DO NOT COMPRISE THE SAME SENSORS OR CAPABILITIES AS THE OTHER DEVICE OR DEVICES)

FIG. 12

DIGITAL PROCESSING RESOURCE 1500:

1501. COMPRISES AT LEAST ONE DIGITAL PROCESSOR.

1502. DIGITAL PROCESSING RESOURCE OPERABLE TO:
    1502.1 RECEIVE DATA FROM AT LEAST ONE SENSOR, THE DATA BEING AT LEAST IN PART REPRESENTATIVE OF A SCENE.
    1502.2 DETECT RELIABILITY OF SENSOR DATA AND GENERATE RELIABILITY INFORMATION.
    1502.3 REMEDY UNRELIABLE SENSOR DATA TO GENERATE REMEDIED DATA.
        (1502.3.1 REMEDYING CAN INCLUDE: EXCLUDING UNRELIABLE DATA.)
        (1502.3.2 REMEDYING CAN INCLUDE: REDUCING CONTRIBUTION FROM UNRELIABLE SENSOR DATA INTO THE RICH SCENE INFORMATION.)
        (1502.3.3 REMEDYING CAN INCLUDE: NOTIFYING USER (VIA A DISPLAY) OF UNRELIABLE DATA.)
        (1502.3.4 REMEDYING CAN INCLUDE: PRESENTING TO USER (VIA A DISPLAY) INTUITIVE VISUAL CUES, CONFIGURED SO AS TO TEND TO DIRECT USER TO ACT IN A MANNER TO RESOLVE A CONDITION CAUSING UNRELIABLE DATA.)
            (1502.3.4.1 VISUAL CUES CAN BE APPLIED VIA DISPLAY TO REGION OF AN IMAGE OF SCENE, THE REGION BEING ASSOCIATED WITH THE UNRELIABLE DATA.)
            (1502.3.4.2 VISUAL CUES CAN INCLUDE A VISUAL EFFECT.)
                -(VISUAL EFFECT CAN INCLUDE A BLUR EFFECT)
                -(VISUAL EFFECT APPLIED MORE STRONGLY IN RESPONSE TO GREATER DETECTED UNRELIABILITY OF SENSOR DATA (LOWER DETECTED LEVEL OF RELIABILITY OF SENSOR DATA))
    1502.4 GENERATE RICH SCENE INFO. FROM (A) THE SENSOR DATA, INCLUDING REMEDIED DATA AND (B) THE RELIABILITY INFORMATION
        (1502.5 RECONSTRUCT SCENE AS VIEWED FROM VIRTUAL VIEWPOINT, BASED ON RICH SCENE INFO.)
        (1502.6 DETERMINE WHETHER A SENSOR IS OCCLUDED.)
        (1502.7 IDENTIFY INVALID PATTERNS IN RECEIVED SENSOR DATA.)
        (1502.8 TRANSMIT THE RICH SCENE INFORMATION TO A REMOTE DEVICE, THE REMOTE DEVICE BEING A DEVICE REMOTE FROM THE SCENE AND OPERABLE TO RECEIVE TRANSMITTED RICH SCENE INFORMATION.)

(1503. GIVEN AT LEAST ONE SENSOR ASSOCIATED WITH A CAPTURING DEVICE, THE SENSOR ASSOCIATED WITH THE CAPTURING DEVICE BEING OPERABLE TO CAPTURE FIRST SCENE INFORMATION REPRESENTATIVE OF A SCENE, A DIGITAL PROCESSING RESOURCE ASSOCIATED WITH THE CAPTURING DEVICE IS OPERABLE TO: TRANSMIT SENSOR DATA AND/OR RICH SCENE INFORMATION.)

(1504. A DIGITAL PROCESSING RESOURCE ASSOCIATED WITH A REMOTE DEVICE IS OPERABLE TO NOTIFY THE CAPTURING DEVICE OF UNRELIABLE TRANSMITTED DATA REPRESENTATIVE OF THE SCENE.)

(1505. THE CAPTURING DEVICE PRESENTS AN INDICATION OF UNRELIABLE TRANSMITTED DATA.)

(1506. THE REMOTE DEVICE PRESENTS AN INDICATION OF UNRELIABLE RECEIVED DATA.)
    (1506.1 THE INDICATION OF UNRELIABLE DATA PRESENTED BY THE CAPTURING DEVICE CORRELATES WITH AN INDICATION OF UNRELIABLE DATA PRESENTED BY THE REMOTE DEVICE.)
    (1506.2 THE INDICATION OF UNRELIABLE DATA PRESENTED BY THE CAPTURING DEVICE IS CONFIGURED SO AS TO TEND TO DIRECT A USER OF THE CAPTURING DEVICE TO REMEDY AN OCCLUDED SENSOR.)

FIG. 15

DETECTING RELIABILITY/UNRELIABILITY OF SENSOR DATA:

IN DIGITAL PROCESSING RESOURCE 1500:

(1601. DETECTING RELIABILITY CAN INCLUDE UTILIZING A HEURISTIC.)

(1602. DETECTING RELIABILITY CAN INCLUDE COMPARING THE OUTPUT OF A SENSOR TO THE OUTPUT FROM ONE OR MORE ADDITIONAL SENSORS.)

(1602.1 THE COMPARING CAN INCLUDE COMPARING SUBSECTIONS OF DATA INDEPENDENTLY.)

(1602.2 COMPARING CAN UTILIZE AT LEAST ONE HISTOGRAM.)

(1602.2.1 HISTOGRAMS CAN PERTAIN TO DEPTH DATA.)

(1602.2.2 HISTOGRAMS CAN PERTAIN TO STEREO DISPARITY DATA.)

(1602.3 COMPARING CAN INCLUDE GENERATING AN AVERAGE.)

(1602.4 COMPARING CAN INCLUDE COMPARING LUMINANCE DATA FROM ONE OR MORE CAMERAS.)

(1602.5 COMPARING CAN INCLUDE COMPARING COLOR DATA FROM ONE OR MORE CAMERAS.)

1603. SENSORS ARE OPERABLE TO GENERATE SENSOR DATA IN RESPONSE TO SENSED CONDITIONS AND COMMUNICATE SENSOR DATA TO DIGITAL PROCESSING RESOURCE.

(1604. SENSORS CAN INCLUDE AT LEAST ONE STEREO PAIR OF CAMERAS OPERABLE TO CAPTURE SCENE INFORMATION REPRESENTATIVE OF A SCENE.)

(1605. THE RICH SCENE INFORMATION CAN INCLUDE DEPTH INFORMATION.)

(1606. THE DEPTH INFORMATION CAN BE OBTAINED BY STEREO DISPARITY ANALYSIS.)

FIG. 16

TRANSMITTING DEVICE 1700:

TRANSMITTING DEVICE IS OPERABLE TO:

1701. CAPTURE FIRST SCENE INFORMATION, REPRESENTATIVE OF A SCENE, GENERATED BY AT LEAST ONE SENSOR ASSOCIATED WITH THE TRANSMITTING DEVICE.

(1702. CAPTURE ORIGINATING ENVIRONMENTAL PARAMETERS.)

1703. PROCESS THE FIRST SCENE INFORMATION TO GENERATE RICH SCENE INFORMATION.

(1703.1 THE PROCESSING CAN INCLUDE DATA COMPRESSION.)

(1704. TRANSMIT THE RICH SCENE INFORMATION TO THE RECEIVING DEVICE.)

FIG. 17

RECEIVING DEVICE 1800 (OPERABLE TO COMMUNICATE WITH TRANSMITTING DEVICE):

RECEIVING DEVICE IS OPERABLE TO:

(1801. CAPTURE DESTINATION ENVIRONMENTAL PARAMETERS.)

1802. RECEIVE THE RICH SCENE INFORMATION TRANSMITTED BY THE TRANSMITTING DEVICE.

1803. INTERPRET THE RICH SCENE INFORMATION.

(1803.1 THE INTERPRETING CAN INCLUDE DATA DECOMPRESSION.)

1804. PRESENT THE SCENE, BASED AT LEAST IN PART ON THE RICH SCENE INFORMATION.

(1804.1 PRESENTING THE SCENE CAN INCLUDE DISPLAYING AT LEAST ONE IMAGE OF THE SCENE, VIA A DISPLAY ELEMENT OPERABLE TO COMMUNICATE WITH THE RECEIVING DEVICE, BASED AT LEAST IN PART ON THE RICH SCENE INFORMATION.)

FIG. 18

ENVIRONMENTAL PARAMETERS / ORIENTATION VECTOR(S):

IN CONNECTION WITH DIGITAL PROCESSING RESOURCE OR OTHER ELEMENTS OF RECEIVING OR TRANSMITTING DEVICE(S):

(1901. ORIGINATING ENVIRONMENTAL PARAMETERS CAN INCLUDE PARAMETERS ASSOCIATED WITH THE SCENE.)
(1902. ORIGINATING ENVIRONMENTAL PARAMETERS CAN INCLUDE PARAMETERS ASSOCIATED WITH THE TRANSMITTING DEVICE.)
(1903. DESTINATION ENVIRONMENTAL PARAMETERS CAN INCLUDE PARAMETERS ASSOCIATED WITH THE ENVIRONMENT PROXIMATE THE RECEIVING DEVICE.)
(1904. DESTINATION ENVIRONMENTAL PARAMETERS CAN INCLUDE PARAMETERS ASSOCIATED WITH THE RECEIVING DEVICE.)
(1905. TRANSMITTING DEVICE CAN TRANSMIT ORIGINATING ENVIRONMENTAL PARAMETERS TO THE RECEIVING DEVICE, AND THE RECEIVING DEVICE CAN UTILIZE THE ORIGINATING ENVIRONMENTAL PARAMETERS IN PRESENTING THE SCENE.)
(1906. RECEIVING DEVICE CAN TRANSMIT THE DESTINATION ENVIRONMENTAL PARAMETERS TO THE TRANSMITTING DEVICE, AND THE TRANSMITTING DEVICE CAN UTILIZE THE DESTINATION ENVIRONMENTAL PARAMETERS IN PROCESSING THE FIRST SCENE INFORMATION TO GENERATE RICH SCENE INFORMATION.)
(1907. THE ENVIRONMENTAL PARAMETERS CAN INCLUDE AN ORIENTATION VECTOR.)
(1908. ORIENTATION VECTOR CAN BE MEASURED UTILIZING ANY OF AN ACCELEROMETER, GYROSCOPE, COMPASS, GPS (GLOBAL POSITIONING SYSTEM), OTHER SPATIAL SENSOR, OR COMBINATION OF SPATIAL SENSORS.)
(1909. ORIENTATION VECTOR IS SUBSTANTIALLY CONSTRAINED WITH RESPECT TO A GIVEN DEVICE, BUT CAN BE ALTERED IN RESPONSE TO A SUBSTANTIAL CHANGE IN DATA FROM A SPATIAL SENSOR.)
(1910. SPATIAL SENSOR CAN INCLUDE ANY OF AN ACCELEROMETER, GYROSCOPE, COMPASS, GPS, OTHER SPATIAL SENSOR, OR COMBINATION OF SPATIAL SENSORS.)
(1911. AN ORIENTATION VECTOR IS PERMITTED TO MOVE TO ALIGN WITH THE ORIENTATION OF AN ASSOCIATED DEVICE IN A GRAVITY FIELD.)
(1912. THE DIGITAL PROCESSING RESOURCE IS OPERABLE TO APPLY A SELECTED SMOOTHING PROCESS TO SMOOTH HIGH FREQUENCY CHANGES TO AN ORIENTATION VECTOR.)
(1913. DIGITAL PROCESSING RESOURCE IS OPERABLE TO CONFIGURE CONTROL LOGIC TO APPLY THE SELECTED SMOOTHING PROCESS.)
(1914. AN ORIENTATION VECTOR CAN BE AT LEAST IN PART CONTROLLED BY A USER THROUGH A USER INTERFACE.)
(1915. THE ORIENTATION VECTOR CAN BE DERIVED FROM THE RICH SCENE INFORMATION.)
(1916. TRANSMITTING DEVICE: PROCESSING OF SCENE INFORMATION CAN INCLUDE ROTATING OR TRANSFORMING THE RICH SCENE INFORMATION WITH RESPECT TO AN ORIENTATION VECTOR.)
(1917. RECEIVING DEVICE: INTERPRETING OF SCENE INFORMATION CAN INCLUDE ROTATING OR TRANSFORMING THE RICH SCENE INFORMATION WITH RESPECT TO AN ORIENTATION VECTOR.)
(1918. THE INTERPRETING OR THE PROCESSING UTILIZES ORIENTATION VECTORS FROM MORE THAN ONE DEVICE.)
(1919. THE INTERPRETING OR THE PROCESSING UTILIZES THE DIFFERENCE BETWEEN ORIENTATION VECTORS FROM MORE THAN ONE DEVICE.)
(1920. AT LEAST ONE TRANSMITTING OR RECEIVING DEVICE ROTATES OR TRANSFORMS THE SCENE INFORMATION, AND THE RECEIVING DEVICE PRESENTS THE SCENE WITH A CONSISTENT, DEFINED DOWNWARD ORIENTATION THAT IS SUBSTANTIALLY ALIGNED WITH A SELECTED AXIS OF THE TRANSMITTING DEVICE OR DEVICES, IRRESPECTIVE OF THE ROTATION OF THE DEVICES.)

FIG. 19

DISPLAY ELEMENT(S):

(2001. RECEIVING DEVICE IS OPERABLE TO PRESENT AT LEAST ONE IMAGE OF THE SCENE VIA A DISPLAY ELEMENT.)

(2002. TRANSMITTING DEVICE IS OPERABLE TO GENERATE FEEDBACK VIEW THAT PRESENTS FEEDBACK TO A USER OF THE TRANSMITTING DEVICE.)

(2002.1 FEEDBACK CAN INCLUDE AN IMAGE OF THE SCENE.)

(2003. DISPLAY ELEMENT CAN BE A COMPONENT OF THE TRANSMITTING DEVICE OR THE RECEIVING DEVICE.)

(2004. DISPLAY ELEMENT CAN BE EXTERNAL TO THE TRANSMITTING DEVICE OR THE RECEIVING DEVICE.)

(2005. DISPLAY ELEMENT CAN INCLUDE A HEAD-MOUNTED DISPLAY (HMD).)

(2006. DISPLAY ELEMENT CAN INCLUDE A DISPLAY SCREEN ON A HAND-HELD DEVICE.)

(2007. DISPLAY ELEMENT CAN INCLUDE ANY OF A DESKTOP DISPLAY SCREEN, FREESTANDING DISPLAY SCREEN, WALL MOUNTED DISPLAY SCREEN, SURFACE MOUNTED DISPLAY SCREEN OR OUTDOOR DISPLAY SCREEN.)

FIG. 20

USER CONTROLS / OTHER CONTROLS ENABLED BY
TRANSMITTING/RECEIVING DEVICES AND PROCESSING RESOURCES:

(2101. RECEIVING DEVICE OPERABLE TO PRESENT DIFFERENT PORTION OF THE SCENE FROM THE PORTION PRESENTED BY THE FEEDBACK VIEW OF THE TRANSMITTING DEVICE.)
(2102. RECEIVING DEVICE OPERABLE TO ENABLE USER OF RECEIVING DEVICE TO SELECT THE PORTION OF THE SCENE PRESENTED BY RECEIVING DEVICE.)
(2103. RECEIVING DEVICE OPERABLE TO ENABLE USER OF RECEIVING DEVICE TO SELECT A GAZE DIRECTION TO CHANGE A VIRTUAL VIEWPOINT, THEREBY TO CONTROL THE VIEWPOINT OF THE SCENE PRESENTED BY THE RECEIVING DEVICE.)
(2104. RECEIVING DEVICE OPERABLE TO ENABLE USER OF RECEIVING DEVICE TO SELECT A GAZE DIRECTION BY UTILIZING A TOUCH SCREEN INTERFACE ASSOCIATED WITH THE RECEIVING DEVICE.)
(2105. GAZE DIRECTION CAN BE CONTROLLED AT LEAST IN PART BY THE OUTPUT OF AN ACCELEROMETER, GYROSCOPE, COMPASS, GPS, OTHER SPATIAL SENSOR, OR COMBINATION OF SPATIAL SENSORS.)
(2106. RECEIVING DEVICE OPERABLE TO ENABLE USER OF RECEIVING DEVICE TO CONTROL GAZE DIRECTION BY EXECUTING A USER GESTURE OBSERVABLE BY A NON-CONTACT SENSOR ASSOCIATED WITH THE RECEIVING DEVICE.)
(2107. RECEIVING DEVICE OPERABLE TO ENABLE GAZE DIRECTION TO BE CHANGED BY THE PHYSICAL POSITION OF A USER RELATIVE TO A PHYSICAL POSITION OF A RECEIVING DEVICE.)
(2108. RECEIVING DEVICE OPERABLE TO ENABLE USER OF RECEIVING DEVICE TO CHANGE FOCUS OF A VIRTUAL CAMERA THAT DEFINES A PERSPECTIVE OF A DISPLAYED IMAGE OF THE SCENE.)
(2108.1. FOCUS CAN BE CHANGED BY THE USER SELECTING A REGION OF A DISPLAYED IMAGE TO BRING INTO SHARP FOCUS.)
(2108.2 RECEIVING DEVICE OPERABLE TO ENABLE USER OF RECEIVING DEVICE TO CHANGE FOCUS BY EXECUTING A USER GESTURE OBSERVABLE BY A NON-CONTACT SENSOR ASSOCIATED WITH RECEIVING DEVICE.)
(2109. RECEIVING DEVICE OPERABLE TO ENABLE USER OF RECEIVING DEVICE TO CHANGE FIELD OF VIEW OF DISPLAYED IMAGE.)
(2109.1 RECEIVING DEVICE OPERABLE TO ENABLE USER OF RECEIVING DEVICE TO CHANGE FIELD OF VIEW BY EXECUTING A GESTURE ON A TOUCH SCREEN ASSOCIATED WITH THE RECEIVING DEVICE.)
(2109.2 FIELD OF VIEW CAN BE CHANGED BY MOTION OF DEVICE, THE MOTION BEING DETECTED BY AN ACCELEROMETER, GYROSCOPE, COMPASS, GPS, OTHER SPATIAL SENSOR, OR COMBINATION OF SPATIAL SENSORS.)
(2109.3. RECEIVING DEVICE OPERABLE TO ENABLE USER TO CHANGE FIELD OF VIEW BY EXECUTING A GESTURE OBSERVABLE BY A NON-CONTACT SENSOR ASSOCIATED WITH RECEIVING DEVICE.)
(2109.4 FIELD OF VIEW CAN BE CHANGED BY THE PHYSICAL POSITION OF A USER, RELATIVE TO THE PHYSICAL POSITION OF A RECEIVING DEVICE.)
(2110. RECEIVING DEVICE IS OPERABLE TO ENABLE USER OF RECEIVING DEVICE TO CHANGE AN IMAGE ZOOM PARAMETER.)
(2110.1 RECEIVING DEVICE OPERABLE TO ENABLE USER OF RECEIVING DEVICE TO CHANGE ZOOM PARAMETER BY EXECUTING A GESTURE ON A TOUCH SCREEN ASSOCIATED WITH RECEIVING DEVICE.)
(2110.2 ZOOM CAN BE CHANGED BY MOTION OF DEVICE, THE MOTION BEING DETECTED BY AN ACCELEROMETER, GYROSCOPE, COMPASS, GPS (GLOBAL POSITIONING SYSTEM), OTHER SPATIAL SENSOR, OR COMBINATION OF SPATIAL SENSORS.)
(2110.3 RECEIVING DEVICE IS OPERABLE TO ENABLE USER OF RECEIVING DEVICE TO CHANGE ZOOM PARAMETER BY EXECUTING A GESTURE OBSERVABLE BY NON-CONTACT SENSOR ASSOCIATED WITH RECEIVING DEVICE.)
(2110.4 ZOOM IS CONTROLLABLE BY THE PHYSICAL POSITION OF A USER, RELATIVE TO THE PHYSICAL POSITION OF A RECEIVING DEVICE.)

FIG. 21

OTHER FUNCTIONS OF RECEIVING DEVICE(S) / TRANSMITTING DEVICE(S):

(2201. RECEIVING DEVICE CAN BE OPERABLE TO ATTEMPT TO PRESERVE THE SPATIAL TOPOLOGY OF THE SCENE CAPTURED BY THE TRANSMITTING DEVICE.)

(2202. A TRANSMITTING OR RECEIVING DEVICE IS OPERABLE TO APPLY A SCALE FACTOR TO THE RICH SCENE INFORMATION.)

(2202.1. A TRANSMITTING OR RECEIVING DEVICE IS OPERABLE TO ENABLE A USER TO MODIFY THE SCALE FACTOR VIA A CONTROL INTERFACE.)

(2203. IN A PLURALITY OF RECEIVING DEVICES AND TRANSMITTING DEVICES, AT LEAST ONE RECEIVING DEVICE IS OPERABLE TO ADDITIONALLY FUNCTION AS A TRANSMITTING DEVICE, AND AT LEAST ONE TRANSMITTING DEVICE IS OPERABLE TO ADDITIONALLY FUNCTION AS A RECEIVING DEVICE.)

(2204. IN A PLURALITY OF TRANSMITTING DEVICES AND RECEIVING DEVICES, SOME OF THE DEVICES DO NOT COMPRISE THE SAME SENSORS OR CAPABILITIES AS THE OTHER DEVICE OR DEVICES.)

FIG. 22

VISUAL COMMUNICATIONS METHODS, SYSTEMS AND SOFTWARE

CROSS-REFERENCE TO RELATED APPLICATIONS, INCORPORATION BY REFERENCE

This patent application is a 35 USC 371 National Stage of PCT Pat. App. PCT/US18/48197 filed Aug. 27, 2018, which claims the priority benefit of commonly owned U.S. Provisional Pat. App. 62/550,685 filed Aug. 27, 2017, entitled "Visual Communications Methods, System and Software"; and is a continuation-in-part (CIP) of commonly owned, co-pending PCT patent application PCT/US16/23433 filed Mar. 21, 2016, entitled "Virtual 3D Methods, Systems And Software", published as WO/2016/154123; which claims the priority benefit of U.S. Provisional Pat. App. 62/136,494 filed Mar. 21, 2015. This patent application is also a CIP of U.S. patent app. Ser. No. 15/560,019 filed Sep. 20, 2017; (U.S. Pat. No. 10,551,913), which is a 371 National Stage of PCT/US16/23433; each of the above-listed patent applications being incorporated by reference herein as if set forth herein in its entirety, including all text and drawings thereof.

This patent application is also related to commonly owned, co-pending PCT patent application PCT/US16/32213 entitled "Facial Signature Methods, Systems and Software", published as WO/2016/183380, which claims the priority benefit of U.S. Provisional App. 62/160,563 filed 12 May 2015; each of the above-listed patent applications being incorporated by reference herein as if set forth herein in its entirety, including all text and drawings thereof.

This patent application is also related to commonly owned, co-pending PCT patent application PCT/US18/19243 entitled "Image Reconstruction for Virtual 3D", claims the priority benefit of U.S. Provisional Pat. App. 62/462,307 filed Feb. 22, 2017; each of the above-listed patent applications being incorporated by reference herein as if set forth herein in its entirety, including all text and drawings thereof.

BACKGROUND OF THE INVENTION

It would be desirable to provide methods, systems, devices and computer software/program code products that enable efficient handling of unreliable sensor data.

It would be desirable to provide methods, systems, devices and computer software/program code products that enable, in a visual communications system involving a plurality of display devices usable by respective users, synchronization to a common space, and display of images by a receiving device in an orientation independent of the angle at which the receiving device is held.

It would also be desirable to provide methods, systems, devices and computer software/program code products that enable preservation of selected scene scale and orientation across different device configurations.

It would also be desirable to provide such functions at reasonable computational cost.

The present invention provides methods, systems, devices and computer software/program code products that enable the foregoing aspects and others.

Although embodiments and practices of the present invention discussed herein can be used in conjunction with practices and embodiments of the Virtual 3-D ("V3D") inventions described in the above-noted, commonly-owned patent applications incorporated herein by reference, they may also be useful in other systems and in connection with other technologies, and am not limited to application in connection with the V3D inventions described in the patent applications incorporated by reference herein.

Aspects, examples, embodiments and practices of the invention, whether in the form of methods, devices, systems or computer software/program code products, will next be described in greater detail in the following Detailed Description of the invention, in conjunction with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

SUMMARY OF THE INVENTION

The present invention provides methods, systems, devices, and computer software/program code products suitable for a wide range of applications, including, but not limited to: facilitating video communications and presentation of image and video content in telecommunications applications; and facilitating video communications and presentation of image and video content for virtual reality (VR), augmented reality (AR) and head-mounted display (HMD) systems.

Methods, systems, devices, and computer software/program code products in accordance with the invention are suitable for implementation or execution in, or in conjunction with, commercially available computer graphics processor configurations and systems including one or more display screens for displaying images, cameras for capturing images, and graphics processors for rendering images for storage or for display, such as on a display screen, and for processing data values for pixels in an image representation. The cameras, graphics processors and display screens can be of a form provided in commercially available smartphones, tablets and other mobile telecommunications devices, as well as in commercially available laptop and desktop computers, which may communicate using commercially available network architectures including client/server and client/networklcloud architectures.

In the aspects of the invention described below and hereinafter, the algorithmic image processing methods described are executed by digital processors, which can include graphics processor units, including GPGPUs such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

One aspect of the present invention relates to methods, systems and computer software/program code products that enable the generating of rich scene information representative of a scene. This aspect comprises: in a digital processing resource comprising at least one digital processor, (1) receiving data from at least one sensor, the data being at least in part representative of the scene; (2) detecting reliability of the sensor data; (3) remedying unreliable sensor data to generate remedied data; and (4) generating rich scene information from (A) the sensor data, including remedied data, and (B) the reliability information.

Another aspect of the invention comprises reconstructing the scene as viewed from a virtual viewpoint, based on the rich scene information.

In another aspect, the sensors comprise at least one stereo pair of cameras.

In another aspect, the rich scene information comprises depth information.

In yet another aspect, the depth information is obtained by stereo disparity analysis.

In another aspect of the invention, detecting reliability of the sensor data comprises utilizing a heuristic.

In another aspect, detecting reliability of the sensor data comprises: comparing the output of a sensor to the output from one or more additional sensors.

In a further aspect of the invention, the comparing comprises comparing sub-sections of data independently.

In another aspect, the comparing utilizes at least one histogram.

In still another aspect of the invention, the histograms pertain to depth data.

In another aspect, the histograms pertain to stereo disparity data.

In another aspect, the comparing comprises generating an average.

In yet another aspect of the invention, the comparing comprises comparing luminance data from one or more cameras.

In another aspect, the comparing comprises comparing color data from one or more cameras.

Another aspect of the invention comprises determining whether a sensor is occluded.

Another aspect of the invention comprises identifying invalid patterns in the received data.

In another aspect, the remedying comprises excluding unreliable data.

In yet another aspect of the invention, the remedying comprises reducing the contribution from unreliable sensor data into the rich scene information.

In another aspect, the remedying comprises notifying a user of unreliable data.

In still another aspect, the remedying comprises notifying a user, via a display, of unreliable data.

In a further aspect of the invention, the at least one sensor is associated with a device containing the at least one sensor and a display, and the remedying comprises notifying the user, via the display, of unreliable data.

In another aspect, the remedying comprises presenting, to the user, intuitive visual cues via the display, the intuitive visual cues being configured so as to tend to direct the user to act in a manner to resolve a condition causing unreliable data.

In a further aspect, the intuitive visual cues are applied via the display, to a region of an image of the scene, the region being associated with the unreliable data.

In another aspect, the intuitive visual cues comprise a visual effect.

In another aspect of the invention, the visual effect is applied more strongly in response to greater unreliability.

In another aspect, the visual effect comprises a blur effect.

Another aspect of the invention comprises transmitting the rich scene information to a remote device, the remote device being a device remote from the scene and operable to receive transmitted rich scene information.

In another aspect of the invention, the at least one sensor is associated with a capturing device, the capturing device being operable to transmit any of sensor data and rich scene information, and the remote device notifies the capturing device of unreliable transmitted data representative of the scene.

In yet another aspect, the capturing device presents an indication of unreliable transmitted data.

In another aspect, the remote device presents an indication of unreliable received data.

In still another aspect of the invention, the indication of unreliable data presented by the capturing device correlates with an indication of unreliable data presented by the remote device.

In another aspect, the indication of unreliable data presented by the capturing device is configured so as to tend to direct a user of the capturing device to remedy an occluded sensor.

One aspect of the present invention relates to visual communications methods, systems and computer software/program code products, comprising: (A) configuring at least one transmitting device to be operable to: (1) capture first scene information, representative of a scene, generated by at least one sensor associated with the transmitting device; (2) capture originating environmental parameters; (3) process the first scene information to generate rich scene information; and (4) transmit the rich scene information to at least one receiving device; and (B) configuring the at least one receiving device to be operable to: (1) capture destination environmental parameters; (2) receive the rich scene information from the at least one transmitting device; (3) interpret the rich scene information; and (4) present the scene, based at least in pan on the rich scene information.

In another aspect of the invention, presenting the scene comprises displaying at least one image of the scene, via a display element operable to communicate with the receiving device, based at least in part on the rich scene information.

In another aspect, the originating environmental parameters comprise parameters associated with the scene.

In still another aspect of the invention, the originating environmental parameters comprise parameters associated with the transmitting device.

In another aspect, the destination environmental parameters comprise parameters associated with the environment proximate the receiving device.

In yet another aspect, the destination environmental parameters comprise parameters associated with the receiving device.

In another aspect of the invention, the transmitting device transmits the originating environmental parameters to the receiving device, and the receiving device utilizes the originating environmental parameters in presenting the scene.

In another aspect, the receiving device transmits the destination environmental parameters to the transmitting device, and the transmitting device utilizes the destination environmental parameters in processing the first scene information to generate rich scene information.

In another aspect of the invention, the processing of the first scene information comprises data compression.

In another aspect, the interpreting comprises data decompression.

In yet another aspect of the invention, the environmental parameters comprise an orientation vector.

In a related aspect, an orientation vector is measured utilizing any of an accelerometer, gyroscope, compass, GPS (global positioning system), other spatial sensor, or combination of spatial sensors.

In another aspect of the invention, an orientation vector is substantially constrained with respect to a given device, but can be altered in response to a substantial change in data from a spatial sensor.

In still another aspect, the spatial sensor comprises any of an accelerometer, gyroscope, compass, GPS, other spatial sensor, or combination of spatial sensors.

In another aspect, an orientation vector is permitted to move to align with the orientation of an associated device in a gravity field.

Another aspect of the invention comprises applying a selected smoothing process to smooth high frequency changes to an orientation vector.

A further aspect of the invention comprises configuring control logic to be operable to apply the selected smoothing process.

In another aspect, an orientation vector can be at least in part controlled by a user through a user interface.

In a further aspect, an orientation vector is derived from the rich scene information.

In another aspect, the processing comprises rotating or transforming the rich scene information with respect to an orientation vector.

In still another aspect of the invention, the interpreting comprises rotating or transforming the rich scene information with respect to an orientation vector.

In another aspect, the interpreting or the processing utilizes orientation vectors from more than one device.

In yet another aspect, the interpreting or the processing utilizes the difference between orientation vectors from more than one device.

In another aspect of the invention, at least one device rotates or transforms the scene information, and the receiving device presents the scene with a consistent, defined downward orientation that is substantially aligned with a selected axis of the transmitting device or devices, irrespective of the rotation of the devices.

In a further aspect, the receiving device presents at least one image of the scene via a display element.

In one aspect of the invention, the display element is a Head-Mounted Display (HMD).

In another aspect, the display element comprises a display screen on a hand-held device.

In another aspect, the display element comprises any of a desktop display screen, freestanding display screen, wall mounted display screen, surface mounted display screen or outdoor display screen.

In yet another aspect of the invention, the transmitting device is operable to generate a feedback view that presents feedback to a user of the transmitting device.

In a related aspect, the feedback comprises an image of the scene.

In another aspect, the receiving device presents a different portion of the scene from the portion presented by the feedback view of the transmitting device.

Another aspect of the invention comprises enabling a user of a receiving device to select the portion of the scene presented by the receiving device.

Yet another aspect of the invention comprises enabling a user of a receiving device to select a gaze direction to change a virtual viewpoint, thereby to control the viewpoint of the scene presented by the receiving device.

A further aspect of the invention comprises enabling a user to select a gaze direction by utilizing a touch screen interface associated with the receiving device.

In another aspect, a gaze direction can be controlled at least in part by the output of an accelerometer, gyroscope, compass, GPS, other spatial sensor, or combination of spatial sensors.

Another aspect of the invention comprises enabling a user of the receiving device to control gaze direction by executing a user gesture observable by a non-contact sensor associated with the receiving device.

In another aspect, gaze direction can be changed by the physical position of a user relative to a physical position of a receiving device.

In a further aspect, a user of a receiving device can change the focus of a virtual camera that defines a perspective of a displayed image of the scene.

In another aspect of the invention, the focus can be changed by the user selecting a region of a displayed image to bring into sharp focus.

Another aspect of the invention comprises enabling a user of the receiving device to change focus by executing a user gesture observable by a non-contact sensor associated with the receiving device.

A further aspect comprises enabling a user of the receiving device to change a field of view of a displayed image.

Yet another aspect of the invention comprises enabling a user of the receiving device to change field of view by executing a gesture on a touch screen associated with the receiving device.

In another aspect, the field of view can be changed by motion of a device, the motion being detected by an accelerometer, gyroscope, compass, GPS, other spatial sensor, or combination of spatial sensors.

A further aspect of the invention comprises enabling the user to change the field of view by executing a gesture observable by a non-contact sensor associated with the receiving device.

In another aspect, the field of view can be changed by the physical position of a user, relative to the physical position of a receiving device.

Yet another aspect comprises enabling a user of a receiving device to change an image zoom parameter.

A related aspect of the invention comprises enabling a user of a receiving device to change a zoom parameter by executing a gesture on a touch screen associated with the receiving device.

In another aspect, the zoom can be changed by motion of a device, the motion being detected by an accelerometer, gyroscope, compass, GPS (global positioning system), other spatial sensor, or combination of spatial sensors.

Another aspect of the invention comprises enabling a user of a receiving device to change a zoom parameter by executing a gesture observable by non-contact sensors associated with the receiving device.

In a related aspect, the zoom is controllable by the physical position of a user, relative to the physical position of a receiving device.

Another aspect of the invention comprises configuring the receiving device to be operable to attempt to preserve the spatial topology of the scene captured by the transmitting device.

In another aspect, a device is operable to apply a scale factor to the rich scene information.

A further aspect of the invention comprises enabling a user to modify the scale factor via an interface.

In another aspect, in a plurality of receiving devices and transmitting devices, at least one receiving device is operable to additionally function as a transmitting device, and at least one transmitting device is operable to additionally function as a receiving device.

In another aspect of the invention, in a plurality of transmitting devices and receiving devices, some of the devices do not comprise the same sensors or capabilities as the other device or devices.

One aspect of the present invention relates to a system for generating rich scene information representative of a scene, the system comprising: (A) a digital processing resource comprising at least one digital processor; and (B) at least one sensor operable to generate sensor data in response to sensed conditions and to communicate the sensor data to the digital processing resource; the digital processing resource being configured to: (1) receive sensor data from the at least one sensor, the data being at least in part representative of the scene; (2) detect reliability of the received sensor data; (3) remedy unreliable data to generate remedied data; and (4) generate rich scene information from (A) the sensor data, including remedied data, and (B) the reliability information.

Another aspect of the present invention relates to a visual communications system, the system comprising: (A) a transmitting device; and (B) a receiving device operable to communicate with the transmitting device; the transmitting device being configured to be operable to: (1) capture first scene information, representative of a scene, generated by at least one sensor associated with the transmitting device; (2) capture originating environmental parameters; (3) process the first scene information to generate rich scene information; and (4) transmit the rich scene information to the receiving device; and the receiving device being configured to be operable to: (1) capture destination environmental parameters; (2) receive rich scene information transmitted by the transmitting device; (3) interpret the rich scene information; and (4) present the scene, based at least in part on the rich scene information.

In another aspect of the invention, the scene is presented via a display element operable to communicate with the receiving device.

One aspect of the present invention relates to a program product for use with a digital processing system, the digital processing system comprising a digital processing resource comprising at least one digital processor, the digital processing resource being operable to communicate with at least one sensor operable to (i) generate sensor data in response to sensed conditions and (ii) communicate the sensor data to the digital processing resource, the program product comprising digital processor-executable program instructions stored on a non-transitory digital processor-readable medium, which when executed in the digital processing resource cause the digital processing resource to: (1) receive sensor data from the at least one sensor; (2) detect reliability of the received sensor data; (3) remedy the unreliable data to generate remedied data; and (4) generate rich scene information from (A) the sensor data, including remedied data, and (B) the reliability information.

Another aspect of the invention relates to a program product for use with a digital processing system, the digital processing system comprising a digital processing resource, the digital processing resource comprising at least one digital processor in any of a digital transmitting device or a digital receiving device operable to communicate with the digital transmitting device, the program product comprising digital processor-executable program instructions stored on a non-transitory digital processor-readable medium, which when executed in the digital processing resource cause the digital processing resource to (A) configure the transmitting device to be operable to: (1) capture first scene information, representative of a scene, through at least one sensor associated with the transmitting device; (2) capture originating environmental parameters; (3) process the first scene information to generate rich scene information; and (4) transmit the rich scene information to the receiving device; and (B) configure the receiving device to be operable to: (1) capture destination environmental parameters; (2) receive the rich scene information transmitted by the transmitting device; (3) interpret the rich scene information; and (4) present the scene, based at least in part on the rich scene information.

In another aspect, the scene is presented via a display element operable to communicate with the receiving device.

The present invention enables the features described herein to be provided at reasonable computational cost, and in a manner easily accommodated within the digital processing capabilities and form factors of modern mobile devices such as tablets and smartphones, as well as the form factors of laptops, PCs, computer-driven televisions, computer-driven projector devices, and the like, does not dramatically alter the economics of building such devices, and is viable within current or near-current communications network/connectivity architectures.

These and other aspects, examples, embodiments and practices of the invention, whether in the form of methods, devices, systems or computer software/program code products, will be discussed in greater detail below in the following Detailed Description of the Invention and in connection with the attached drawing figures. Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 1-7 are schematic diagrams depicting exemplary embodiments and practices of the invention.

FIGS. 8A-12 are flowcharts depicting exemplary practices of the invention.

FIGS. 13-22 are schematic block diagrams depicting exemplary embodiments and practices of the invention.

DETAILED DESCRIPTION OF THE INVENTION

Overview

Figure 1:
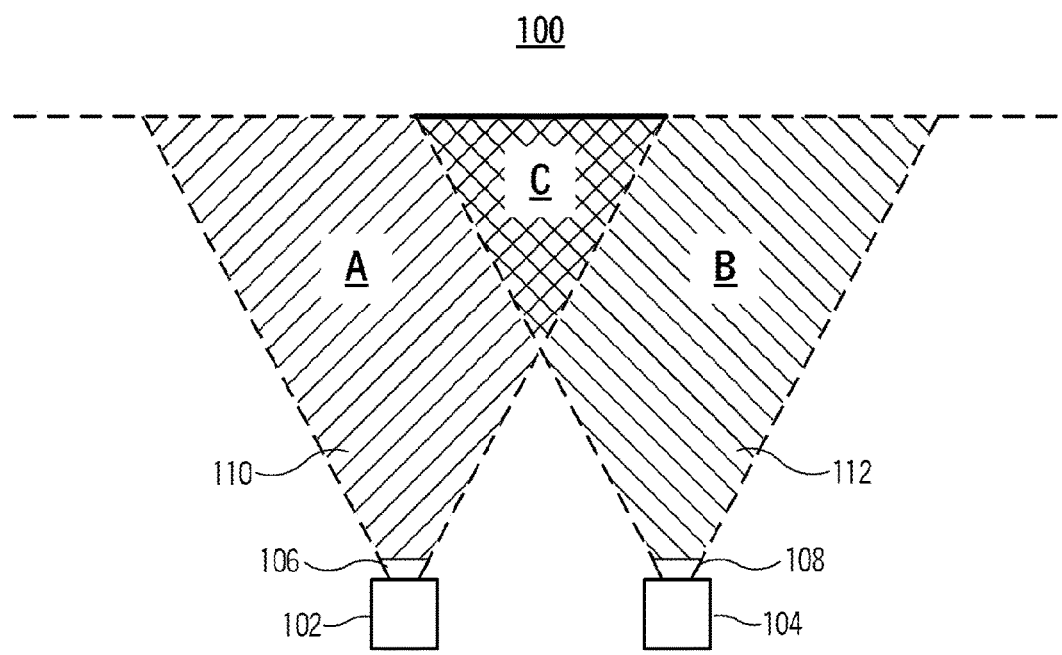

The following discussion describes exemplary practices and embodiments that, among other aspects, improve and expand the functions of V3D systems and devices, including those described in commonly-owned PCT application PCT/US16/23433, incorporated by reference herein.

The following discussion also describes aspects of the user experience associated with V3D systems and devices utilizing the inventions described herein, and various methods and systems in accordance with the present inventions to enable the described user experience.

The following discussion also describes adaptations in the user interface, design and behaviors of V3D devices and systems that enable such devices and systems to detect sub-optimal operating conditions (such as, for example, a blocked/occluded camera or other sensor), compensate for those conditions, and encourage user behaviors that allow optimal V3D functioning and discourage user behaviors that inhibit it.

In addition, as will also be discussed below, the V3D devices and systems described herein and in commonly owned PCT application PCT/US16/23433 function as visual portals into other spaces. Given this functionality, to provide a more convincing user experience to a human user or users, V3D devices and systems can be configured in accordance with the present invention to capture and transmit information about the environment in which they are operating. Such information can include, but is not limited to, the orientation of the captured data relative to the device, as well as real-world scale information about the devices being used.

I. Handling Unreliable Senor Data

Background

The functioning of systems and devices constructed in accordance with the teachings of commonly owned PCT application PCT/US16,23433 ("V3D" systems and devices), or any similar systems and devices that rely on two or more cameras with overlapping views, or the use of depth-sensing sensors in order to produce rich information about the scene, can be negatively affected by unreliable sensor information. In the case of a system that uses stereo camera pairs, this includes situations in which the views of one camera are not easily correlated to the views from another.

In a stereo camera pair, this can be caused by the positions of objects within the view of the cameras being outside the tolerable spatial range dictated by alignments and separation between the individual camera views. It can also be caused by the parameters or limitations of the correlation logic of the systems or devices. For example, an object that is too close to the cameras may no longer allow tractable correlation between two independent camera views.

An extreme example is an object that is only visible to one camera of a stereo pair. In that case, correlation of that object with the other camera's view is impossible. An example of this is depicted in the schematic diagram of FIG. 1, which depicts an example of different respective spatial regions, associated with a two-camera configuration, including a region for which it is possible to correlate objects (i.e., calculate correspondence) between the camera pair, and other regions where it is not possible to calculate correspondence between the camera pair.

In particular, FIG. 1 shows a configuration 100 with cameras (or other sensors) 102 and 104 having a view of a scene. Camera 102 includes a sensor 106 and has a field of view 110. Camera 104 has a sensor 108 and a field of view 112. As shown in FIG. 1, the fields of view of the respective cameras overlap, yielding a region of overlap "C", in which correlation is possible, and regions "A" and "B" in which correlation is not possible.

An even more extreme example is that of an object, such as a user's hand, substantially filling the view of one or more cameras, and occluding the view of the objects and features that could otherwise be correlated with the view from the corresponding cameras in the respective pairs.

Description of Exemplary Implementations

An exemplary practice of this aspect of the present invention comprises two overall components: (1) detection of unreliable sensor data; and (2) remedy. (The term "unreliable data" is used herein to subsume a number of possible conditions, including sensor-generated data that is erroneous, invalid, missing, unsuitable or otherwise deemed or determined to be unreliable.) In an exemplary practice of the invention, Detection is a process, which may be a continuous process, of monitoring the data from the cameras or sensors and making a determination about the reliability and usability of the incoming data. If sub-optimal or erroneous conditions are detected, then Remedy is the process of taking action to correct for the unreliable data, either by adjusting the processing to compensate, by providing feedback to the user so that they may take action, or a combination of both.

In a communications system, some remedies may be more appropriate to take on the device where an image of the scene is presented, while other remedies may be better taken on the device where the camera data originates. Remedies can also be deployed on both originating and presenting device(s).

Detecting erroneous or sub-optimal data is not always a trivial matter. Sometimes a determination must be made based on incomplete or "fuzzy" information. However, there are often multiple clues indicating that all or part of the image data from one or more cameras may not be reliable or useable.

Reliability information may comprise a reliability indicator for each camera, a reliability indicator for each camera pair, or a more fine-grained structure to represent reliability.

In the case where part of a data set is unreliable, a reliability map may be created. A reliability map may apply to a camera image, a disparity map, or another data set. It may contain a single bit for each data element or group of elements expressing whether the associated elements represent reliable data. It may also contain a value indicating a degree of reliability ranging from highly reliable to unreliable.

Figure 2:
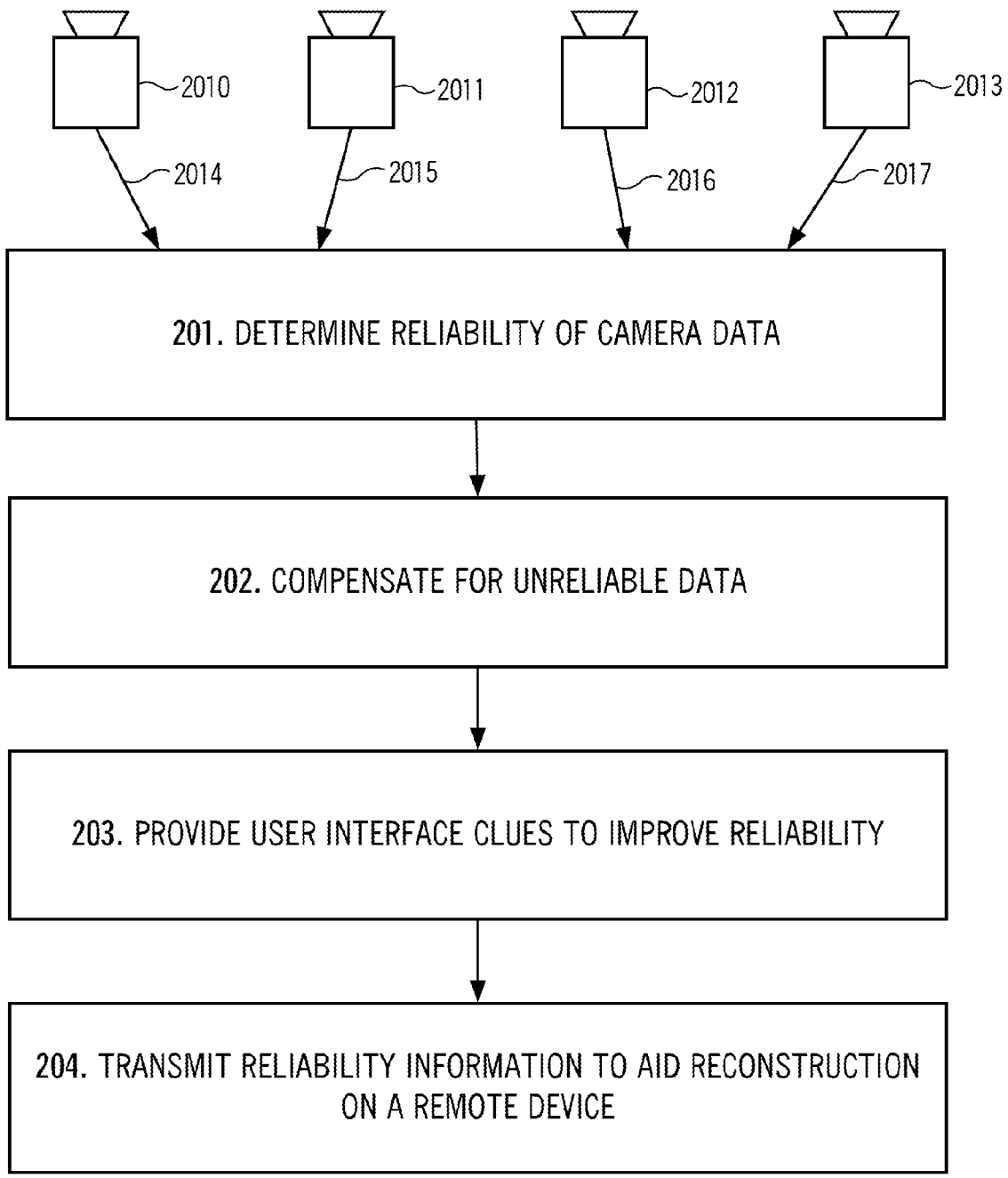

FIG. 2 is a schematic diagram depicting an example, in accordance with a practice of the invention, of a processing pipeline for detecting and remedying unreliable data generated, in this case, by four cameras/sensors. In particular, FIG. 2 shows a configuration 200 having four cameras (or other sensors) 2010, 2011, 2012, 2013, which capture or generate data 2014, 2015, 2016, 2017, respectively, and apply the data into a pipeline of stages 201, 202, 203, 204, as follows: (201) determine reliability of camera data; (202) compensate for unreliable data; (203) provide user interface cues to increase reliability, and (204) transmit reliability information to aid reconstruction on a remote device.

Reliability Detection Using Luminance or Image Comparison

Luminance may be an easy clue to measure. Measuring the luminance from each camera and comparing it with the luminance from the other cameras can provide a clue about the reliability of the camera data. If one camera on a device or one camera in a set of cameras produces luminance data that is an outlier to the data produced by the other cameras, the outlier camera data may be unreliable.

Two cameras that are calibrated consistently with principally the same view should have very similar luminance values. If the view fields are mostly similar, then that similarity puts an upper bound on the difference in luminance that would be measured if the cameras were viewing the same objects. Therefore, luminance discrepancies provide one possible indicator of unreliability in the incoming camera data.

Excessive luminance variations could be caused by unintentional field-of-view obstruction over one or more cameras, or by high intensity light directed into one or more cameras from a light source or reflection.

A simple process for comparing luminance between cameras is to use the average luminance across all camera pixels.

A more sophisticated measurement of luminance is to build a histogram of luminance values across the pixels of the incoming camera image. Using a histogram instead of an average would be robust to false negatives caused by objects in the camera image being substantially different, but sharing a similar image-wide mean luminance value.

One histogram could be created for each camera, but it may be beneficial to create multiple histograms for each sub-region of the camera output. In some cases these sub-regions may overlap each other.

Similar to luminance, color information could also be used and presents some advantages, although it requires more data to represent and may not be as reliable or robust as luminance in all situations.

Coarse Image Comparison

Along the same lines as an average luminance method, comparison of low-resolution versions of the camera outputs can provide suitability or reliability information.

A coarse image comparison method may be superior to an average luminance method for detecting objects that move too close to a camera pair, such that they have exceeded the maximum range of the stereo disparity solution method used by a multi-camera system.

A feature of a coarse image comparison method is that suitability information for regions of the image can be produced, as opposed to rejecting the entire camera's information. This is desirable for some adaptation behaviors and unnecessary for others.

Reliability Detection Using Reconstructed Depth or Disparity Analysis

Another clue is available from stereo correspondence data between images from a pair of cameras, or from depth data made available from sensors or a sensor pipeline. Stereo correspondence data may be processed into reconstructed depth data, or it may represent raw disparity values.

Several methods are available to determine if disparity or depth values should be considered reliable, and examples of these will next be discussed.

Disparity, or Depth Distribution Analysis

One method is to compare the distribution of disparity data among multiple camera pairs. In one embodiment, histogram data can be generated representing the distribution of disparity values or the distribution of depth values calculated for each stereo pair. Cameras belonging to pairs for which the distributions are found to be substantially different from other pairs may be considered to include erroneous data. The amount of difference considered tolerable may be based on the amount of overlap between the respective fields of view for different camera pairs.

A similar method can also be used to determine the reliability of depth data from any source where multiple sensors are used. For example, depth data from one or more active depth sensing sensors can be compared with reconstructed depth data from one or more camera pairs.

In another embodiment, histograms can be created from depth data sourced from more than one depth-sensing sensor, or from one or more camera pairs, and compared with other histograms to determine reliability of the sensor data.

Visibility Pattern Analysis

Another method involves executing pattern analysis on the data. In some situations the camera data or reconstructed depth data may contain a pattern that would be impossible to observe in valid data given the optics of the cameras and their position relative to each other. In such a situation it is valuable to identify the regions of the image for which the data is unreliable, as well as to determine bounds information that may be used to digitally synthesize or "hallucinate" plausible replacement information.

This technique is valid for stereo camera pairs that reconstruct depth from disparity analysis, as well as other depth sensing sensors. The particular implementation details of a given example will pertain to disparity-based depth information reconstructed from a given stereo pair.

This aspect of the invention is also applicable in other sensor configurations, although the patterns may be different for different categories of sensors.

Figure 3:
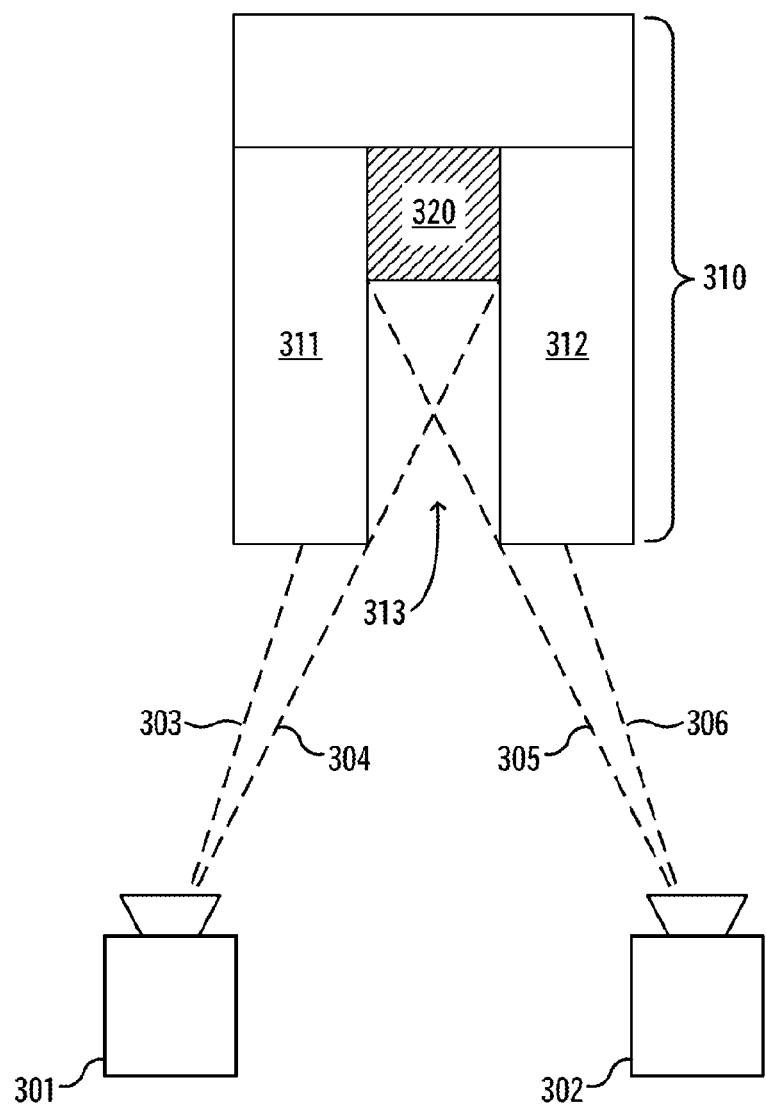

By way of example, FIG. 3 is a schematic diagram depicting a sensor (e.g., camera pair) where disparity deltas beyond some limiting bounds are impossible to observe; in particular, an example of geometry for which stereo correlation is impossible with a given camera configuration.

FIG. 3 shows a configuration 300 having two cameras 301 and 302, having a view of a scene containing an object 310. The object 310 has elongate "legs" 311 and 312 that form a "well" 313. As depicted by rays 303, 304 (shown as dashed lines) for camera 301 and rays 305, 306 for camera 302, and assuming ray 304 forms an extreme of the field of view of camera 301, and ray 305 forms an extreme of the field of view of camera 302, then the region or "box" 320 (shown with hatching) within the well 313 of object 310 forms an "Invisible Region" in the configuration 300.

In an exemplary practice of the invention, data indicating that a given geometric pattern has been observed, such as the geometric pattern associated with the box 320 of FIG. 3 denoted as an "Invisible Region", may be considered unreliable. More particularly, in the illustrated example, depth information derived from the disparity information allows a maximum change in disparity information to be computed across the entire camera image. This calculated data can be expressed as a disparity bounds function. In accordance with this aspect of the invention, areas of the image where the disparity information changes more rapidly than the bounds function allows, i.e., at a higher spatial frequency than the sensor can observe, are indicative of unreliable data.

It should be noted that FIG. 3 is only one example of practices in accordance with the invention, and unreliable data is not always associated with the regions of lower disparity, i.e., at further distance or depth from the camera (as in the example of FIG. 3). It is also possible that regions of high disparity, as may be found at lesser depth from the camera, are providing invalid data. In either case, it can be concluded, using a disparity analysis, that some of the data is unreliable.

It is also possible, in a given instance, that the observed objects do in fact contain geometric features that, with hypothetically perfect detection, would produce depth values outside of acceptable thresholds. However, because such values are not detectable from the depth sensors or the stereo analysis of the camera images, a system in accordance with the invention can determine or conclude that such values are unreliable, and an example of practice in accordance with the invention would treat such values as unreliable.

Systems in which disparity values are influenced by the analysis of more than one camera pair or more than one depth sensor have a higher tolerance for these situations, but it is still possible to observe a situation for which accurate depth is impossible to determine for a given portion of the image.

Virtual Viewpoint Reconstruction with Reliability Awareness

Virtual viewpoint reconstruction, as taught in one or more of the commonly-owned V3D patent applications listed above and incorporated herein by reference, can make use of multiple disparity maps from multiple pairs of cameras. In such a system, multiple disparity values may be considered for each pixel or each image element, and the system selects suitable disparity values from among the values in the input disparity maps or by blending values appropriately. Often the generation of final disparity values involves using the output of a stereo comparison error function.

In accordance with exemplary practices of the present invention, an associated reliability indicator can also be used in addition to or instead of the error function, to determine a best final disparity value for an image element.

In an example system comprising three cameras, and therefore three camera pairs, reliable correspondence for a portion of the image may be unavailable for one camera pair. In this case, the disparity information must be determined using the correspondence from the remaining two camera pairs.

In the same three-camera example system, covering one camera with a hand effectively invalidates data from two available camera pairs, and thus requires the reconstruction process to utilize only the single remaining camera pair.

Some reconstruction methods or algorithms involve one camera in a set of cameras being designated as the master camera for the set. Often this designation is arbitrary, and is useful as an optimization or as a matter of implementation convention. In a system wherein a master camera is designated, the designation may be changed in response to changes in the reliability information associated with the master camera and/or the reliability information associated with one or more other cameras in the set of cameras.

Examples of multi-camera configurations are depicted and described in the above-listed, commonly owned patent applications incorporated herein by reference, including, but not limited to, PCT patent applications PCT/US16/23433 entitled "Virtual 3D Methods, Systems And Software", and PCT/US18/19243 entitled "Image Reconstruction for Virtual 3D".

Conveying Information to Users to Increase Data Reliability

Some of the conditions leading to unreliable data can be easily remedied by a human user of a V3D device or system. (Examples of such conditions include a circumstance in which a camera or other sensor is occluded by the user's finger or hand.) In these situations, it would be useful to communicate to the user in a manner that is unobtrusive, but which intuitively prompts the user to take corrective action.

Often the V3D device or system (for example, a commercially available smartphone configured to execute a V3D method in accordance with the invention) comprises a display element in addition to the camera pairs and/or sensors. This display may provide an efficient mechanism for the device system to communicate feedback to the user. Some embodiments, such as a content-capture device akin to a personal video camera, may provide a monitor or viewfinder through which the user is able to observe a sample reconstruction of the scene being captured by the cameras and/or other sensors on the device.

Another example embodiment is a mirroring device, through which the user is able to observe him or herself, possibly from different perspectives than would be available from a conventional mirror. A similar mirroring feature may also be present in a communications system, which may include a display that may show a virtual viewport to make the user aware of the visual data that they are transmitting to other users.

For other embodiments, a simpler feedback mechanism can be used. For example, a series of LED lights, or an LED light that varied in color to indicate the degree of reliability of the data, could enable correct positioning in front of a device.

Another embodiment could make use of audible feedback, such as a warning sound, or a voice message.

Partial Frame Unreliability

A problematic condition can arise when an object is too close to the cameras, such that the disparity for that object, with respect to a given camera pair, is too great. Similarly, other depth-sensing sensors may have range limits that create similar issues.

This situation is both common, and especially jarring, when the object in question is the user themselves, or a part of the user's body, such as a hand or the face.

In such a situation, an exemplary embodiment of the system can identify which parts of the reconstructed image incorporate the unreliable data. In addition, it may also be possible to determine the degree of unreliability for sub-regions of the image. When the unreliability in a given region of the image increases beyond a selected threshold, an exemplary embodiment of the system can alter the processing of data pertaining to that "unreliable region" in response to the increased unreliability.

In an exemplary practice of the invention, visual cues can then be provided in the regions of the display reflecting the unreliable data, such cues being configured to tend to cause a human user to take corrective action to remedy the operating condition causing the unreliable sensor data. These visual cues can be overt, such as drawing an indication, drawing an icon, drawing a sprite, or drawing a shape on the user's view of the scene. They can also involve changing the shading, outlining, tinting, blending in a color or a pattern, applying a blur, applying a filter, or applying an image effect to the image regions containing unreliable data or to objects that are contained or partially contained within those image regions. (The software aspects of drawing an icon, sprite or shape on a display element, or applying or changing shading, colors, blurs, filters, or image effects on a display element, are known to those skilled in the art, and will not be described in detail here.)

In an exemplary practice of the invention, some visual cues can be applied more or less strongly depending on the degree of unreliability of the data. For example, a face moving closer to the cameras may begin to blur slightly when the depth or disparity data begins to approach a threshold for unreliability. As the face moves closer still, the blur intensifies. A blur and similar effects can serve a dual purpose, both to notify the user of a sub-optimal situation, and also to hide or distract from any artifacts caused by the unreliable data.

An example of such a practice, in accordance with the present invention, is shown in FIG. 4. The schematic diagram of FIG. 4 shows an example of blur being applied in proportion to data unreliability, in accordance with an exemplary practice of the present invention. As a face (depicted schematically in FIG. 4) approaches an imaging device, eventually to the point of increasing sensor data unreliability, the face is seen to occupy a greater portion of the display, but the system applies increasingly more blur, to compensate for the increased unreliability from the depth or disparity data, and, in an exemplary practice of the invention, to alert the user of the data unreliability.

In particular, FIG. 4, consisting of FIGS. 4A, 4B and 4C, shows an example of a display element 410, with surrounding cameras (or other sensor elements) 411, 412, 413, 414. The display element presents an image 420 of a face. As the face approaches the cameras or other imaging device or sensors, the displayed image 420 of the face occupies a greater portion of the display 410 (compare FIGS. 4A, 4B, and 4C), while the system applies increasingly more blur. Note that the increasing blur shown in FIGS. 4A-4C is generated by the system, in accordance with the invention, in response to the increase in data unreliability, while the increased portion of the screen occupied is merely incidental, sharing the same root cause of the object (e.g., face) being closer to the camera pairs, thereby increasing the difficulty of detecting correspondence on that object.

It is expected that this practice will be intuitively useful to human users of such a system, in that they will intuitively understand that their overly close approach to the cameras is causing the blur, and they will intuitively correct the situation by moving away from the cameras.

In another exemplary practice of the invention, objects may be blurred (i.e., the system can apply a selected amount of blur) as they approach the edge of the field of view.

In some exemplary embodiments and practices of the invention, only the affected regions of the screen are blurred, while in other embodiments, a better user experience is delivered by blurring the entire screen. In this case, the degree of blur may be dictated by the portion of the image with the highest detected unreliability. This strategy may be particularly useful in a video-chat embodiment.

Occluded Cameras or Outlier Sensors

When one or more cameras or other sensors are unable to produce reliable data due to occlusion or other causes, the absence of reliable data may manifest as artifacts throughout the image. These issues may not necessarily manifest in a way that can be intuitively attributed to the missing data from the camera or cameras, or sensors.

Accordingly, in an exemplary practice of the invention, the system can continuously monitor each camera and/or each sensor and make a determination whether a given camera or sensor is occluded or otherwise impeded. In situations where it can be determined that a camera or sensor is occluded, this information can be communicated to a user so that the user may take action. A message may be shown to the user on the device's display, or an icon may also be drawn to alert the user to the situation. A useful indicator may be an arrow, to show the user which of the cameras or sensors is responsible for the unreliable data.

Another method of indicating to the user that a camera is occluded is to create a blurry region, a shaded region, a darkened region, a colored region, or a region in which a pattern is displayed in the area of the screen near to where the affected camera or sensor is mounted on the device.

The schematic diagram of FIG. 5 depicts an exemplary practice of the invention, in which a display 410 and camera (411, 412, 413, 414) device shows a reconstructed image 420 of a face, with a shaded region 430 in the lower right-hand portion of the display screen, the shaded region being generated by the system to indicate to the human user of the display/camera device that that the lower right camera 413 (as seen by the user of the display/camera device) is occluded. (In this example, cameras 411, 412 and 414 and un-occluded, and camera 413 is occluded.) The shaded region 430 of FIG. 5 thus draws the user's attention to an occluded camera.

In other embodiments of the invention, on a device where the display is not necessarily positioned near or between the cameras or sensors, the visual indication may communicate the relative or abstract position or positions of the occluded camera, cameras, sensor, or sensors. For example, a "camcorder-like" icon can be displayed to draw the user's attention to the lower right corner of the viewfinder display if the lower right camera is occluded—even if, for example, the entire sensor array is positioned to the left of the viewfinder display.

In an example embodiment, reconstruction logic will take steps to minimize the impact of the unreliable camera data and perform the reconstruction with the available data, but the user interface software may additionally highlight the unreliable camera to the user by creating a visually prominent indication on the image displayed to the user. FIG. 5 depicts an example of this practice of the invention.

Other Methods of Conveying Information to the User in a Communications System

When depth or disparity data are used in a communications system, such as a video-chat system or any other system with a sender and a receiver, the user device, or device that collects the data, is often not the user or device that ultimately displays the data. Therefore, the system should communicate any erroneous conditions to the user operating the device collecting the data.

In accordance with the invention, some embodiments may detect erroneous conditions on the transmitting device or system, while some embodiments may detect erroneous conditions on the receiving side. When errors are detected on the receiving side, the receiving device can respond with a message to the transmitting device, which can then prompt the transmitting device to take appropriate corrective action, including displaying a visual indication to the user operating or otherwise interacting with the transmitting device. In many instances, both the transmitting and receiving device may be operable to detect errors.

In an exemplary practice of the invention, a transmitting device with a plurality of cameras allows a 360 degree field of view to be reconstructed. A receiving device then reconstructs a 120 degree subset of the view field. In this example, sensors contributing to regions outside the receiver's reconstructed view do not affect the receiver's experience. Also in this example, a user operating the receiving device may change the subset of the field of view in order to reconstruct a different portion of the view or observe the scene from a different virtual viewpoint. If some sensors or cameras were occluded, it may not affect the result as observed by the receiver until the receiving user changes the viewpoint. In this case, the receiving device could then send information or a notification to the transmitting device to indicate that the data being transmitted is unreliable in a way that is now affecting the desired operation.

Self-Monitor or "Picture in Picture"

In accordance with the present invention, when the embodiment involves a device or system with a self-monitor apparatus, the methods detailed above may be sufficient. In many instances, this self-monitor device may be virtual, such a"picture in picture" feature or feedback view that shows the user a sample from the data they are transmitting, in addition to the data that they are receiving.

In accordance with exemplary practices of the invention, simple techniques or strategies for alerting the user include reporting errors through icons, messages, or sounds communicated to the user by the transmitting device being employed by the user.

Another exemplary practice of the invention goes further, and involves "hijacking" the display on the transmitting device when an error condition arises. For example, a display on the transmitting device may switch to display information notifying the user of the error in the transmitted data upon detection of the error conditions. This could manifest in the transmitting user seeing an image of themselves on the display, possibly along with an error message, instead of seeing the person on the other end of a video chat.

False Indications

Another strategy for a video-chat system is to display indications to the user, mixed into data that the user is receiving from the other party in the chat. Such indications are referred to herein as "false indications."

For example, in accordance with the invention, a user who moves his face too close to a camera pair may see the image blur on their display. The system can cause this to happen, as an alert to the user, in spite of the fact that the image on the user's display is reconstructed from "clean" data received from the other party in the chat session. In this case, the blur is imposed by the system primarily to prompt the user to back away from the camera pair and thus improve the quality of the data he or she is transmitting.

Concomitantly, in this example of the invention, the display on the receiver's device could also impose a full or partial blur to mask the unreliability in the transmitted data.

These "false indications" can include any or all of the previously disclosed notification strategies. For example, a hand moving too close to the sensors on a transmitting device may cause the system to blur the region of the transmitting device's display corresponding to where the receiving device may see the hand reconstructed from unreliable data.

In an exemplary video-chat embodiment of the invention, the indications may mirror one another. Thus, by way of example, a receiving device that performs a blur or presents an indication to hide artifacts during reconstruction on the receiving side may instruct the transmitting device to perform the same or a related blur, or present the same or a related indication.

II. Synchronization to a Common Space

Figure 6:
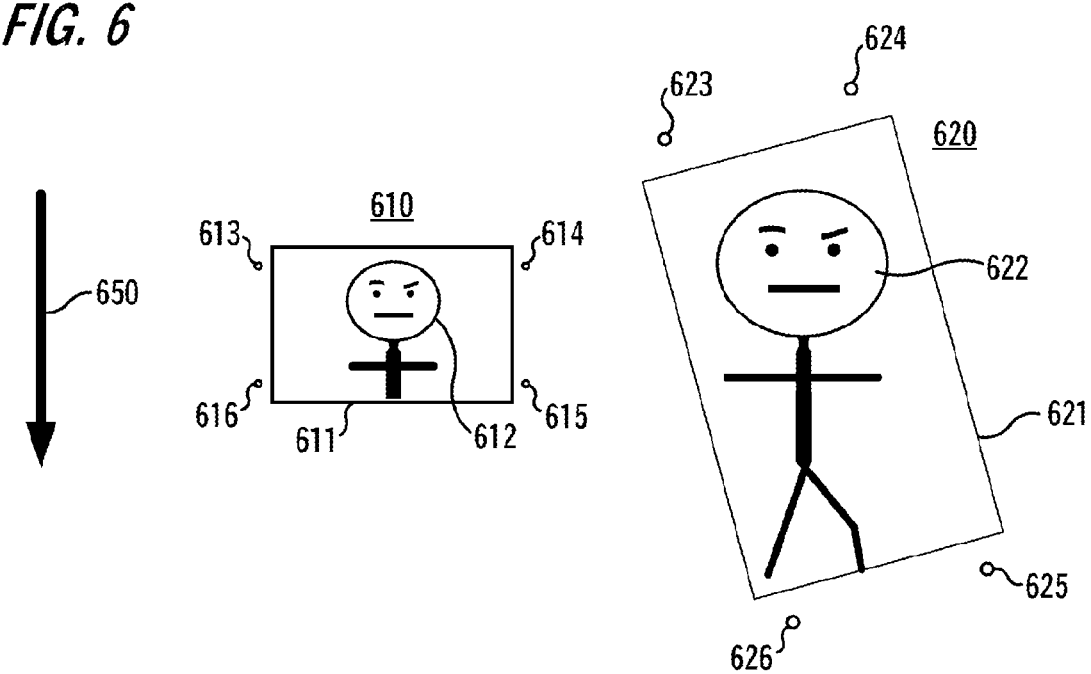

Another aspect of the invention, depicted schematically in FIG. 6, relates to capturing a scene on a transmitting device, and then presenting that scene on a receiving device such that the orientation of the presented scene is consistent with respect to a world orientation vector, regardless of the orientation(s) of the respective devices.

In particular, FIG. 6 shows a transmitting device 610 and a receiving device 620 (such as smartphones, tablet computing devices, or the like), each provisioned with cameras or other sensors, as indicated by the circle or dot elements 613, 614, 615, 616, and 623, 624, 625, 626, at or near the corners of the display screens 611, 621 of the respective devices 610, 620 in the example of FIG. 6; and in which, regardless of the angle at which the transmitting and receiving devices are held or oriented, the reconstructed image 622 of the person (indicated schematically by a stick figure) displayed on the receiving device 620 remains "vertical", wherein the term "vertical" is defined with relation to a "world downward orientation" indicated by the arrow 650 at the left-hand side of FIG. 6. (In the example of FIG. 6, the image 612 shown on display 611 of transmitting device 610 can be, for example, a mirroring of the image 622 shown on the display 621 of receiving device 620. In other examples, such as in a full-duplex configuration in which a given device both transmits and receives, image 612 on display 611 of device 610 could be an image of the user of the "opposite" device 620.)

Typically, as on the Earth, the world downward orientation would be a conventional downward vector defined by gravity or a gravity field. In other, non-Earth settings, the downward orientation could be defined by a dominant perceived direction of consistent acceleration. This manner of orientation of the presented image, irrespective of the angle at which the receiving device is held, but defined instead by the relationship between the scene captured by the transmitting device and a defined world downward orientation, is referred to herein as synchronization to a common space. FIG. 6 thus shows a scene captured on a transmitting device that is presented on a receiving device, such that the orientation is consistent with respect to a world orientation vector, regardless of the orientations of the transmitting and receiving devices.

Figure 7:
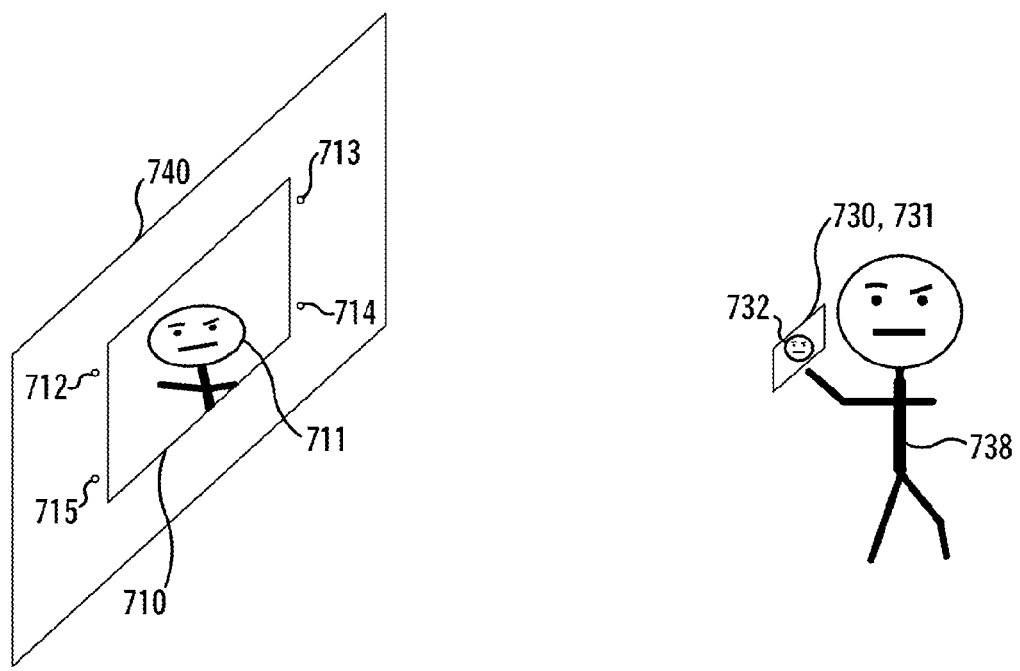

Another exemplary practice of the invention is depicted in FIG. 7, which is a schematic diagram illustrating a system in accordance with the invention, comprising, among other elements, a wall-mounted display device 710 (mounted on wall or other planar surface 740) and a hand-held device 730 with a display 731, with which a user (indicated by stick FIG. 738) is interacting. Device 710 has cameras or other sensors 712, 713, 714, 715, and displays an image 711. Device 730 may also have cameras or other sensors (not shown), and displays an image 732. In accordance with the exemplary practice of the invention depicted in FIG. 7, a selected scene scale and orientation can be preserved across different device configurations. Although a deliberate and defined scale factor can be applied to account for device-specific usage modalities or user preference—such as, for example, to take into account difference in the size of the users hand-held device platform 730 and its display screen 731, and the presumably much larger wall-mounted device 710 and its larger display screen, which may be used by another user, or even a mass audience (not shown in FIG. 7)—the real-world geometric proportions of a given captured scene can be preserved in such a practice of the invention.

III. Other Implementation Details and Examples

As discussed herein and depicted schematically in the drawing figures, including FIGS. 6 and 7, exemplary practices and embodiments of the invention provide visual communications methods, systems and computer program code products (software) that include or operate in association with (A) at least one transmitting device operable to: (1) capture first scene information through cameras and/or other forms of sensors; (2) capture originating environmental parameters (such as scene orientation, luminosity and other parameters); (3) digitally process the first scene information to generate rich scene information; and (4) transmit the rich scene information to (B) at least one receiving device, in which the at least one receiving device is operable to: (1) capture destination environmental parameters; (2) receive the rich scene information transmitted by the transmitting device: (3) interpret the received rich scene information; and (4) present the scene, such as by presenting the scene on a display screen, at least in part based on the rich scene information.

The scene can be presented, for example, by displaying an image of the scene on a device used by a human user. The scene could also be displayed on different forms of display elements, which could include public display elements, such as billboards or other public displays.

In exemplary practices of the invention, the transmitting device or devices transmit the originating environmental parameters to the receiving device or devices, and the receiving device or devices utilize the originating environmental parameters in presenting the scene.

Also in such exemplary practices, the receiving device or devices transmit the destination environmental parameters to the transmitting device or devices, and the transmitting device or devices make use of the destination environmental parameters to process the rich scene information.

In another aspect of the invention, the digital processing of first scene information to generate rich scene information comprises data compression. The processing can also comprise data decompression.

In another aspect, the environmental parameters comprise an orientation vector. The orientation vector can be measured using an accelerometer, gyroscope, compass, GPS (global positioning system), other spatial sensor, or any combination of spatial sensors. (Known forms of commercially available mobile devices use a plurality of sensors, in concert, in a manner referred to as "sensor fusion," to provide, for use by application developers and others, a "best guess" 3D orientation of the device at any given moment of operation.) In another practice of the invention, an orientation vector is constrained with respect to a device, but may be changed by a substantial change in data from an accelerometer.

In an exemplary practice, an orientation vector is allowed to move smoothly to align with the orientation of a device in a gravity field, such as may be found on the Earth.

In another exemplary practice, the invention additionally comprises control logic, operable to smooth high frequency changes to an orientation vector In a further exemplary practice of the invention, an orientation vector may be influenced by a user through a user interface.

In another exemplary practice of the invention, an orientation vector is derived from the rich scene information.

In a further exemplary practice of the invention, processing of rich scene information comprises rotating or transforming the rich scene information with respect to an orientation vector.

In another exemplary practice of the invention, interpreting the rich scene information comprises rotating or transforming the rich scene information with respect to an orientation vector. Orientation vectors from more than one device may be considered in the same operation or logically connected operations.

In an exemplary practice of the invention, the interpretation or the processing utilizes the difference between orientation vectors from more than one device.

In a further exemplary practice of the invention, a device can rotate or transform the scene information, and the receiving device can present the scene with a consistent downward orientation that is aligned with a selected axis of the transmitting device or devices, irrespective of the respective rotational or angular orientations of the respective devices.

As discussed herein and depicted schematically in the accompanying drawing figures, the receiving device(s) present the scene on a display screen.

In another exemplary practice of the invention, the transmitting device(s) provide a feedback view to allow user(s) of the transmitting device(s) to observe the scene captured by a respective transmitting device on the same device on which it was captured.

In a further exemplary practice of the invention of the invention, the receiving device(s) present a different portion of the scene from the portion presented through the feedback view on the transmitting device or devices.

In another exemplary practice of the invention, a user of a receiving device can control or affect the portion of the scene that is presented on the receiving device.

The Applicants have recognized that it would be useful to be able to adjust gaze direction, focus, field of view, zoom, and/or other parameters in visual communications devices and systems discussed herein. Accordingly, in an exemplary practice of the invention, a user of a receiving device can adjust a selected gaze direction to change a virtual viewpoint. In another practice or embodiment of the present invention, a gaze direction can be controlled or changed by the use of a touch screen interface manipulated by the user; or by an accelerometer, gyroscope, compass, GPS, other spatial detector or combination of spatial detectors; or by a detected or directly applied gesture by a user, as observed by non-contact sensors on a receiving device or by a touchscreen on a receiving device; or by a physical position of a user, relative to the physical position of a receiving device.

In another exemplary practice of the invention, the focus of a virtual camera can be controlled or changed by a user of a receiving device; or by the user selecting a region on a screen to bring into sharp focus; or by a detected or applied a gesture by a user, as observed by non-contact sensors on a receiving device or by a touchscreen on a receiving device.

In another exemplary practice of the invention, the field of view can be controlled or changed by a user of a receiving device; or the field of view can be changed by a user's gesture on a touch screen or a users gesture detected by non-contact sensors; or by motion of a device, as detected by an accelerometer, gyroscope, compass, GPS, or other spatial detector or combination of spatial detectors; or by physical position of a user, relative to the physical position of a receiving device.

In another exemplary practice of the invention, a user of a receiving device can control or change a zoom parameter, such as by a gesture applied to a touchscreen or a gesture detected by a non-contact sensor on a receiving device, or by motion of a device, as detected by an accelerometer, gyroscope, compass, GPS, other spatial sensor, or any combination of spatial sensors, or by physical position of a user, relative to the physical position of a receiving device.

In a further exemplary practice of the invention of the invention, the receiving device(s) attempt to preserve the spatial topology of the scene that was captured by the transmitting device or devices.

In another exemplary practice of the invention, a device applies a scale factor to the rich scene data.

In another exemplary practice of the invention, the scale factor can be modified by a user of a device through an interface usable by the user to control the device.

In a further exemplary practice of the invention of the invention, the receiving device(s) also function as transmitting device(s), and the transmitting device(s) also function as receiving device(s).

In another exemplary practice of the invention, some of the devices are different from other devices in the system, and in particular, some of the devices in the system do not comprise the same sensors or capabilities as the other devices.

Digital Processing Environment in which Invention can be Implemented

Those skilled in the art will understand that the above described embodiments, practices and examples of the invention can be implemented using known network, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicants have implemented aspects of the present invention in prototype form. One implementation comprises a complete device, including four cameras, capable of encoding content and receiving (full-duplex communication). Another is an Apple iPhone-based implementation that can receive and present immersive content (receive-only). The Applicants used the following hardware and software structures and tools, among others, to create the two noted implementations, collectively:

1. A seven inch 1280×800 IPS LCD display.
2. Four PointGrey Chameleon3 (CM3-U3-13S2C-CS) 1.3 Megapixel camera modules with ⅓" sensor size assembled on an aluminum plate with shutter synchronization circuit.
3. Sunex DSL377A-650-F/2.8 M12 wide-angle lenses.
4. An Intel Core i7-6770HQ processor which includes on-chip the following:
   a. An Intel HD Graphics 580 Integrated Graphics Processing Unit; and
   b. An Intel QuickSync video encode and decode hardware pipeline.
5. OpenCL API using Intel Media SDK running on Linux operating system to implement, among other aspects: Image Rectification, Fast Dense Disparity Estimate(s)(FDDE) and Multi-level Disparity Histogram aspects.
6. OpenGL API running on Linux operating system to implement Multiple Native Disparity Map Voting and image reconstruction.
7. Intel Media SDK to access Intel QuickSync video compression hardware.
8. PhidgetSpatial 0/0/3 Basic accelerometer module and Linux API to determine device orientation.
9. DLIB Face Detection library to locate presence of viewers face.
10. In addition, the Apple iOS SDK was used to access accelerometer, gyroscope and compass for device orientation and to access video decode hardware; and the OpenGL ES API to implement multiple native disparity map voting and image reconstruction to enable an iPhone-based prototype of a receiving device.

It is noted that the above-listed hardware and software elements are merely tools or building blocks that can be used in a development process, and not themselves instantiations, embodiments or practices of the invention.

Flowcharts of Exemplary Practices of the Invention

FIGS. 8A-12 are flowcharts illustrating method aspects and exemplary practices of the invention. The methods depicted in these flowcharts are examples only; the organization, order and number of operations in the exemplary practices can be varied; and the exemplary practices and methods can be arranged or ordered differently, and include different or additional functions, whether singly or in combination, while still being within the spirit and scope of the present invention.

Elements shown in the accompanying flowcharts in parentheses, or described below in parentheses, are, among other aspects, optional in a given practice of the invention.

In addition to the discussion below, all the text and respective textual elements of the accompanying flowcharts are incorporated by reference into this Detailed Description of the Invention as if set forth in their entireties in this Detailed Description of the Invention, in the respective order in which they appear in the flowcharts, while noting that the organization, order and number of operations in the exemplary practices can be varied; and the exemplary practices and methods can be arranged or ordered differently, and include different or additional functions.

In particular, FIG. 8 (including FIGS. 8A and 8B) shows a method 800 according to an exemplary practice of the invention, including the following operations:

801. Receive sensor data from at least one sensor, the data being at least in part representative of a scene.
  (801.1 Sensors can comprise at least one stereo pair of cameras.)
  (801.2 Sensors can be associated with or part of a capturing device)
802. Detect or evaluate the reliability of the sensor data, thereby generating reliability information.
  (802.1 Detecting the reliability can include utilizing a heuristic.)
  (802.2 Detecting can include comparing output of a sensor to output of other sensor(s).)
  (802.3 Sub-sections of output can be compared independently.)
  (802.4 The comparing can utilize at least one histogram.)
  (802.5 The histograms can pertain to depth data, stereo disparity data, and/or other data.)
  (802.6 The comparing can involve generating an average.)
  (802.7 The comparing can involve comparing luminance data from one or more cameras.)
  (802.8 The comparing can involve comparing color data from one or more cameras.)
  (802.9 Identify invalid patterns in the received data.)
803. Determine whether at least one sensor is occluded.
804. Remedy the unreliable sensor data to generate remedied data.
  (804.1 The remedying can comprise: excluding unreliable data.)
  (804.2 Remedying can include reducing contribution from unreliable sensor data into rich scene information.)
  (804.3 The remedying can include notifying a user of unreliable data.)
  (804.4 Notifying the user of unreliable data can be through a display.)
  (804.5 The display can be part of a device containing the display and at least one sensor.)
  (804.6 Remedying can include presenting intuitive visual cues on a display, that tend to direct the user to act in a manner to resolve a condition causing unreliable data.)
  (804.7 The intuitive visual cues can be applied to a region of an image of the scene, the region being associated with the unreliable data.)
  (804.8 The intuitive visual cues can include a visual effect.)
  (804.9 The visual effect can be applied more strongly in response to greater unreliability.)
  (804.10 The visual effect can include a blur effect.)
805. Generate rich scene information from (A) the sensor data, including remedied data, and (B) reliability information.
  (805.1 Rich scene information can include depth information.)
  (805.2 The depth information can be obtained by stereo disparity analysis.)
806. Transmit the rich scene information to a remote device, the remote device being a device remote from the scene and operable to receive transmitted rich scene information.
  (806.1 At least one sensor is associated with the capturing device, and capturing device is operable to transmit any of sensor data and rich scene information.)
  (806.2 The remote device can notify the capturing device of unreliable transmitted data representative of the scene.)
  (806.3 The capturing device can present an indication of unreliable transmitted data.)
  (806.4 The remote device can present an indication of unreliable received data.)
  (806.5 An indication of unreliable data, presented by capturing device, can correlate with indication of unreliable data presented by remote device.)
  (806.6 An indication of unreliable data presented by capturing device is configured so as to tend to direct a user of the capturing device to remedy an occluded sensor.)
807. Reconstruct scene as viewed from virtual viewpoint, based on rich scene information.

Figure 9A:
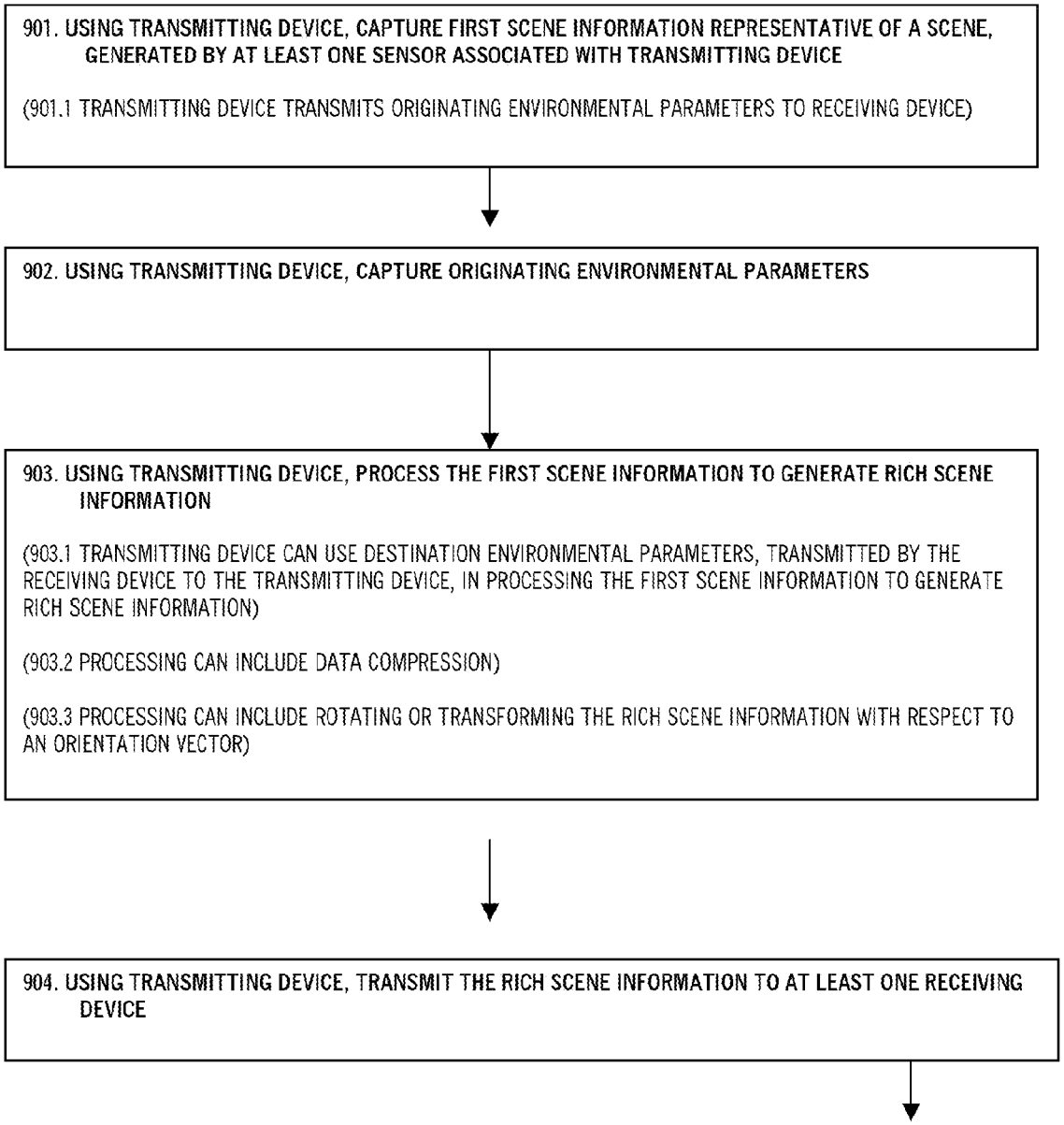

FIG. 9 (including FIGS. 9A and 9B) shows a method 900 according to an exemplary practice of the invention, comprising the following operations:

901. Using transmitting device, capture first scene information representative of a scene, generated by at least one sensor associated with the transmitting device.
  (901.1 The transmitting device transmits originating environmental parameters to the receiving device.)
902. Using transmitting device, capture originating environmental parameters.
903. Using transmitting device, process the first scene information to generate rich scene information.
  (903.1 Transmitting device can use destination environmental parameters, transmitted by the receiving device to the transmitting device, in processing the first scene information to generate rich scene information.)
  (903.2 The processing can include data compression.)
  (903.3 The processing can include rotating or transforming the rich scene information with respect to an orientation vector.)
904. Using transmitting device, transmit the rich scene information to at least one receiving device.
905. Using receiving device, capture destination environmental parameters.
  (905.1 Receiving device can transmit the destination environmental parameters to the transmitting device(s).)
906. Using receiving device, receive the rich scene information from the at least one transmitting device.
907. Using receiving device, interpret the rich scene information.
  (907.1 The interpreting can include data decompression.)
  (907.2 The interpreting can include rotating or transforming the rich scene information with respect to an orientation vector.)
908. Using receiving device, present scene, based at least in part on rich scene information.
  (908.1 The presenting can include displaying at least one image of scene, via display element operable to communicate with receiving device, based at least in part on rich scene information.)
  (908.2 Receiving device utilizes the originating environmental parameters, transmitted to the receiving device by the transmitting device, in presenting the scene.)

(908.3 At least one device (of transmitting or receiving devices) rotates or transforms the scene information.)

(908.4 The receiving device can present the scene with a consistent downward orientation that is substantially aligned with a selected axis of the transmitting device or devices, irrespective of the rotation of the devices.)

(908.5 The receiving device can present at least one image of scene to user, by presenting it on a display element (a Head Mounted Display (HMD), display element on hand-held device, desktop display screen, wall-mounted display, freestanding display, surface mounted display, outdoor display screen or other display element).)

(908.6 the transmitting device can further comprise a feedback view that presents feedback to a user of transmitting device.)

(908.7 The feedback can comprise an image of the scene.)

(908.8 The receiving device can present a different portion of the scene from the portion presented by the feedback view of the transmitting device.)

FIG. 10 shows aspects (collectively 1000) of environmental parameter and orientation vector processing in exemplary practices of the invention, including the following:

(1000.1 Originating environmental parameters can comprise parameters associated with the scene.)

(1000.2 Originating environmental parameters can comprise parameters associated with the transmitting device.)

(1000.3 Destination environmental parameters can comprise parameters associated with the environment proximate the receiving device.)

(1000.4 Destination environmental parameters can comprise parameters associated with the receiving device.)

(1000.5 Originating/destination environmental parameters can include an orientation vector.)

(1000.6 Orientation vector can be substantially constrained with respect to given device, but can be altered in response to a substantial change in data from a spatial sensor.)

(1000.7 A spatial sensor can be any of any of an accelerometer, gyroscope, compass, GPS (Global Positioning System), other spatial sensor, or combination of spatial sensors; and orientation vector can be determined/measured using an accelerometer, gyroscope, compass, GPS, other spatial sensor, or combination of spatial sensors.)

(1000.8 An orientation vector is permitted to move to align with the orientation of an associated device in a gravity field.)

(1000.9 System/method can apply a selected smoothing process to smooth high frequency changes to an orientation vector.)

(1000.10 System/method can configure control logic to be operable to apply selected smoothing process.)

(1000.11 Orientation vector can be at least in part controlled by a user through a user interface.)

(1000.12 Orientation vector can be derived from the rich scene information.)

(1000.13 The interpreting and/or the processing utilize orientation vectors from more than one device.)

(1000.14 The interpreting and/or the processing can use the difference between orientation vectors from more than one device)

FIG. 11 shows aspects (collectively 1100) of user control processes and processing, and aspects of a control interface, in exemplary practices of the invention, including the following:

(1100.1 Enable user of a receiving device to select portion of scene presented by receiving device.)

(1100.2 Enable user of a receiving device to select a gaze direction to change a virtual viewpoint, thereby to control viewpoint of scene presented by receiving device.)

(1100.3 Enable user of to select gaze direction by utilizing a touch screen interface associated with receiving device.)

(1100.4 Gaze direction can be controlled at least in part by output of an accelerometer, gyroscope, compass, GPS, other spatial sensor, or combination of spatial sensors.)

(1100.5 Enable user of receiving device to control gaze direction by executing a user gesture observable by non-contact sensor associated with receiving device.)

(1100.6 Gaze direction can be changed by the physical position of a user, relative to a physical position of a receiving device.)

(110.7 User of receiving device can change the focus of a virtual camera that defines a perspective of a displayed image of scene.)

(1100.8 Focus can be changed by the user selecting a region of a displayed image to bring into sharp focus.)

(1100.9 Enable user of receiving device to change focus by executing a user gesture observable by non-contact sensor associated with a receiving device.)

(1100.10 Enable user of receiving device to change a field of view of a displayed image.)

(1100.11 Enable user of receiving device to change field of view by executing user gesture on a touch screen associated with the receiving device.)

(1100.12 Field of view is controllable/changeable by motion of a device, the motion being detected by an accelerometer, gyroscope, compass, GPS, other spatial sensor, or combination of spatial sensors.)

(1100.13 Enable user to change field of view by executing a user gesture observable by a non-contact sensor associated with receiving device.)

(1100.14 Field of view can be changed by the physical position of a user, relative to the physical position of a receiving device.)

(1100.15 Enable user of a receiving device to change an image zoom parameter.)

(1100.16 Enable user of receiving device to change zoom parameter by executing a user gesture on a touch screen associated with receiving device.)

(1100.17 Zoom can be changed by motion of a device, the motion being detected by an accelerometer, gyroscope, compass, GPS, other spatial sensor, or combination of spatial sensors.)

(1100.18 Enable user of receiving device to change zoom parameter by executing a user gesture observable by a non-contact sensor associated with receiving device.)

(1100.19 Zoom is controllable by the physical position of a user, relative to the physical position of a receiving device.)

FIG. 12 shows aspects (collectively 1200) relating to spatial topology, scaling, and other transmitting/receiving device operations in exemplary practices of the invention, including the following:

(1200.1 Configure receiving device to be operable to attempt to preserve the spatial topology of the scene captured by the at least one transmitting device.)

(1200.2 At least one receiving or transmitting device is operable to apply a scale factor to the rich scene information.)

(1200.3 Enable a user to modify the scale factor via a control interface (such as the touchscreen elements or non-contact sensor elements discussed elsewhere herein.))

(1200.4 In a plurality of receiving devices and transmitting devices, at least one receiving device is operable to additionally function as a transmitting device, and at least one transmitting device is operable to additionally function as a receiving device.)

(1200.5 In a plurality of transmitting devices and receiving devices, some of the devices do not comprise the same sensors or capabilities as the other device or devices.)

Block Diagrams of Exemplary Embodiments of the Invention

FIGS. 13-22 are schematic block diagrams showing aspects of exemplary embodiments of the invention.

In addition to the discussion below, all the text and respective textual elements of the accompanying schematic block diagrams are incorporated by reference into this Detailed Description of the Invention as if set forth in their entirties in this Detailed Description of the Invention, while noting that the organization and number of elements in the exemplary embodiments can be varied; and the exemplary embodiments can be configured differently, and include different, fewer, or additional elements.

Elements shown in the accompanying schematic block diagrams in parentheses, or described below in parentheses, are, among other elements, optional in a given embodiment of the invention.

Figure 13:
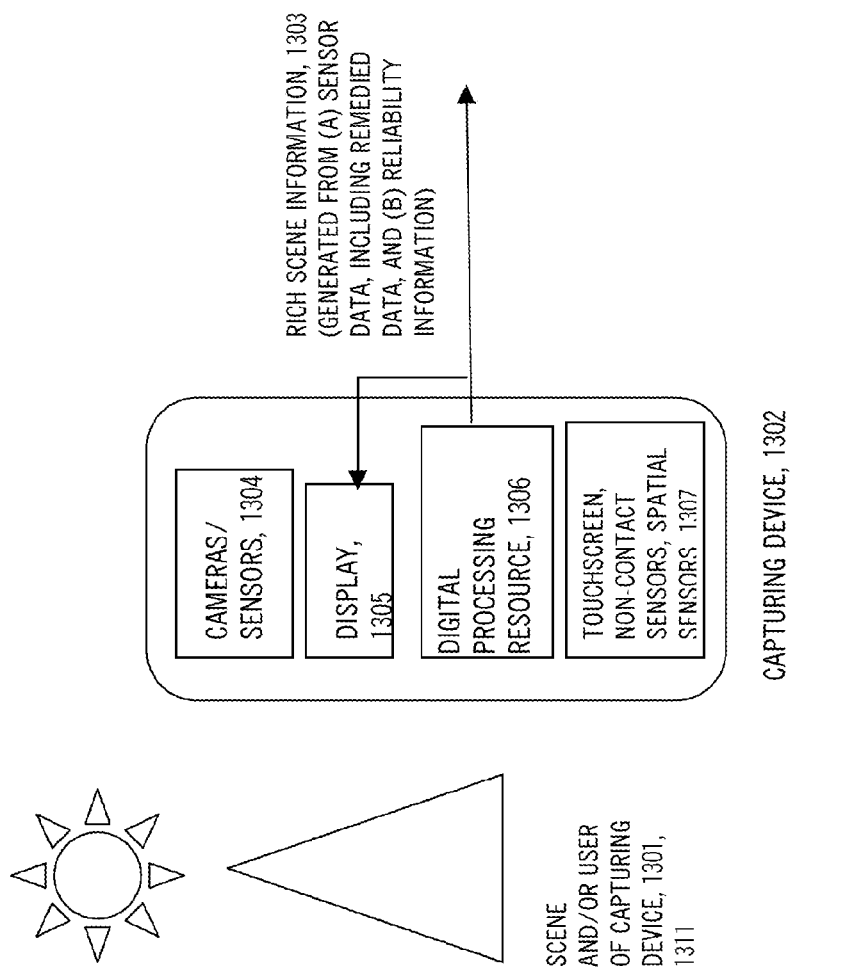

In particular, FIG. 13 is a schematic block diagram showing an embodiment of the invention comprising a capturing device 1302 having cameras and/or other sensors 1304, a display element 1305, and digital processing resource 1306 (containing at least one digital processor), and a touchscreen, non-contact sensors and spatial sensors collectively denominated 1307. The cameras or other sensors 1304 are operable to obtain scene information about a scene 1301, which operation may be under the control of a user 1311, who may control or change operations of the device 1302 via the touchscreen, non-contact sensors and spatial sensors 1307. (A user is not necessarily required, however, as the device may be configured to operate autonomously.) As described in greater detail elsewhere herein, the capturing device and its digital processing resource(s) are operable, in accordance with exemplary practices of the present invention, to capture scene information and process the scene information to generate rich scene information 1303 (shown at the right-hand side of FIG. 13). The rich scene information 1303 can be used by the capturing device itself (for example, to present one or more images on display 1305, as schematically depicted by the arrow running from digital processing resource 1306 to display 1305); and/or the rich scene information 1303 can be transmitted for use elsewhere, as schematically depicted by the arrow from processing resource 1306 and emerging out of the right-hand side of device 1302 as depicted in FIG. 13.

Those skilled in the art will understand that a number of the physical hardware and processing elements discussed in connection with FIG. 13 can be provided by structures found in commercially available smartphones, tablet computing devices, and other such devices, when configured and operated in accordance with exemplary practices of the present invention, and supplemented by additional hardware elements, such as additional cameras and/or other sensors, as may be required by the present invention. The digital processor (not separately shown in FIG. 13) of the digital processing resource 1306 can be of conventional design, such as those found in commercially available smartphones, tablet computing devices, and other such devices, when configured and operated in accordance with exemplary practices of the present invention.

Figure 14:
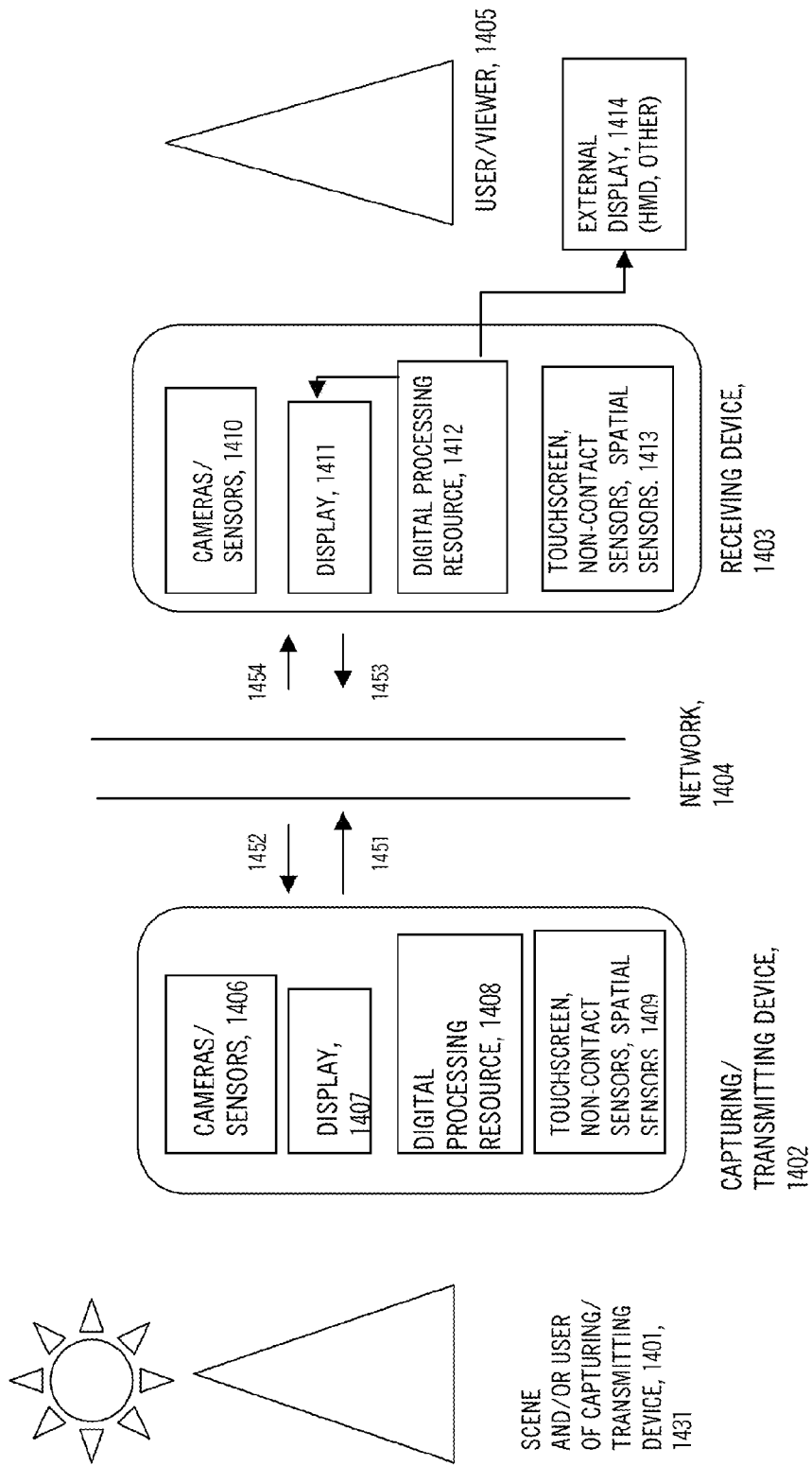

FIG. 14 is a schematic block diagram showing an embodiment of the invention comprising a capturing/transmitting device 1402 and a receiving device 1403 in communication with each other via a network 1404.

As shown in FIG. 14, the capturing/transmitting device 1402 comprises cameras/sensors 1406, a display 1407, a digital processing resource 140H (containing at least one digital processor), and a touchscreen, non-contact sensors and spatial sensors collectively denominated 1409.

The receiving device 1403 comprises cameras/sensors 1410, display 1411, digital processing resource 1412, and touchscreen, non-contact sensors and spatial sensors collectively denominated 1413.

The exemplary embodiment of FIG. 14 also comprises an external display 1414, which may be a head-mounted display (HMD), display screen on a handheld device, wall-mounted display, outdoor display, or other display element, which can be controlled, for example, by the digital processing resource 1412 of receiving device 1403.

The cameras/sensors 1406 of capturing/transmitting device 1402 are operable to capture scene information representative of scene 1401, which operation may be under the control of a user 1431, who may control or change operations of the device via the touchscreen, non-contact sensors and spatial sensors 1409. (A user is not necessarily required, however, as the device may be configured to operate autonomously.) As described in greater detail elsewhere herein, the capturing/transmitting device and its digital processing resource(s) are operable, in accordance with exemplary practices of the present invention, to capture scene information and process the scene information to generate rich scene information.

The capturing/transmitting and receiving device(s) 1402, 1403, can send to each other various data and information (collectively shown as 1451, 1452, 1453, 1454) via network 1404 (which may be, for example, the Internet), and this data can comprise scene information, rich scene information, and environmental parameters in accordance with exemplary practices of the present invention, as described in greater detail elsewhere herein.

By way of example, the capturing/transmitting device 1402 can transmit rich scene information, environmental parameters, and other information, collectively shown as 1451, and transmit them to the receiving device 1403 via network 1404 (see, for example, arrow 1454 running from network 1404 to receiving device 1403). The receiving device can also obtain environmental parameters and other information, collectively shown as 1453, and transmit them to the capturing/transmitting device 1402 via the network 1404 (see, for example, arrow 1452 running from network 1404 to capturing/transmitting device 1402). These aspects are additionally discussed elsewhere herein.

The receiving device 1403 can receive the rich scene information, environmental parameters and other information, and process such data, using its digital processing resource 1412, and present one or more images, based on the rich scene information, environmental parameters and other information, on display 1411 and/or external display 1414, a user or viewer 1404. The image(s) may include reconstructed images of scene 1401.

A user of receiving device 1403 can control or change operations of receiving device 1403 by touchscreen, non-contact sensors and/or spatial sensors 1413 of the receiving device. In some settings, such as an outdoor display embodiment, there may not be a particular "user", per se, but instead one or more human "viewers."

The two-device configuration shown in FIG. 14 can be replicated or expanded to cover a plurality of transmitting devices and a plurality of receiving devices, operable to communicate with each other via a network. Also, in accordance with known network and telecommunications architectures, a given device can act as a transmitting device and a receiving device at different times, or as both at the same or substantially the same time, in a full duplex configuration.

FIG. 15 is a schematic block diagram showing aspects of a digital processing resource 1500 in accordance with exemplary embodiments and practices of the invention. Digital processing resource 1500 can be the same as, or of the same design and configuration as, the digital processing resource 1306 shown in FIG. 13, and digital processing resources 1408, 1412 shown in FIG. 14.

As shown in FIG. 15, digital processing resource 1500:
1501. Comprises at least one digital processor.
1502. Digital processing resource 1500 is operable to:
  1502.1 Receive data from at least one sensor, the data being at least in part representative of a scene.
  1502.2 Detect reliability of sensor data and generate reliability information.
  1502.3 Remedy unreliable sensor data to generate remedied data.
    (1502.3.1 Remedying can include: excluding unreliable data.)
    (1502.3.2 Remedying can include: reducing contribution from unreliable sensor data into the rich scene information.)
    (1502.3.3 The remedying can include: notifying user (via a display) of unreliable data.)
    (1502.3.4 The remedying can include: presenting to user (via a display) intuitive visual cues, configured so as to tend to direct user to act in a manner to resolve a condition causing unreliable data.)
      (1502.3.4.1 Visual cues can be applied via display to region of an image of scene, the region being associated with the unreliable data.)
      (1502.3.4.2 Visual cues can include a visual effect.)
      (Visual effect can include a blur effect.)
      (Visual effect applied more strongly in response to greater detected unreliability of sensor data (lower detected level of reliability of sensor data).)
  1502.4 Generate rich scene information from (A) the sensor data, including remedied data and (B) the reliability information.
  (1502.5 Reconstruct scene as viewed from virtual viewpoint, based on rich scene information.)
  (1502.6 Determine whether a sensor is occluded.)
  (1502.7 Identify invalid patterns in received sensor data.)
  (1502.8 Transmit the rich scene information to a remote device, the remote device being a device remote from the scene and operable to receive transmitted rich scene information.)
(1503. Given at least one sensor associated with a capturing device, the sensor associated with the capturing device being operable to capture first scene information representative of a scene, a digital processing resource associated with the capturing device is operable to: transmit sensor data and/or rich scene information.)
(1504. A digital processing resource associated with a remote device is operable to notify the capturing device of unreliable transmitted data representative of the scene.)
(1505. The capturing device presents an indication of unreliable transmitted data.)
(1506. The remote device presents an indication of unreliable received data.)
(1506.1 the indication of unreliable data presented by the capturing device correlates with an indication of unreliable data presented by the remote device.)
(1506.2 the indication of unreliable data presented by the capturing device is configured so as to tend to direct a user of the capturing device to remedy an occluded sensor.)

FIG. 16 is a schematic block diagram showing aspects, in a digital processing resource 150, of detecting reliability of sensor data, and related processing elements. As indicated in FIG. 16, in a digital processing resource 1500:
(1601. Detecting reliability can include utilizing a heuristic.)
(1602. Detecting reliability can include comparing the output of a sensor to the output from one or more additional sensors.)
  (1602.1 The comparing can include comparing subsections of data independently.)
  (1602.2 The comparing can utilize at least one histogram.)
    (1602.2.1 Histograms can pertain to depth data.)
    (1602.2.2 Histograms can pertain to stereo disparity data.)
  (1602.3 The comparing can include generating an average.)
  (16002.4 The comparing can include comparing luminance data from one or more cameras.)
  (1602.5 The comparing can include comparing color data from one or more cameras.)
1603. Sensors are operable to generate sensor data in response to sensed conditions and communicate sensor data to digital processing resource.
(1604. Sensors can include at least one stereo pair of cameras operable to capture scene information representative of a scene.)
(1605. The rich scene information can include depth information.)
(1606. The depth information can be obtained by stereo disparity analysis.)

FIG. 17 is a schematic block diagram showing aspects of a transmitting device 1700 in accordance with exemplary embodiments and practices of the invention. As indicated in FIG. 17, a transmitting device in accordance with the invention is operable to:
1701. Capture first scene information, representative of a scene, generated by at least one sensor associated with the transmitting device.
(1702. Capture originating environmental parameters.)
1703. Process the first scene information to generate rich scene information.
  (1703.1 The processing can include data compression.)
(1704. Transmit the rich scene information to the receiving device.)

FIG. 18 is a schematic block diagram showing aspects of a receiving device 1800 in accordance with exemplary embodiments and practices of the invention. As indicated in FIG. 18, a receiving device in accordance with the invention is operable to communicate with one or more transmitting devices, and is further operable to:
(1801. Capture destination environmental parameters.)
1802. Receive the rich scene information transmitted by the transmitting device.
1803. Interpret the rich scene information.
  (1803.1 The interpreting can include data decompression.)

1804. Present the scene, based at least in part on the rich scene information.
  (1804.1 Presenting the scene can include displaying at least one image of the scene, via a display element operable to communicate with the receiving device, based at least in part on the rich scene information.)

FIG. 19 is a schematic block diagram showing aspects of processing environmental parameters and/or orientation vector(s) in a digital processing resource or other elements of receiving or transmitting device(s) in accordance with the invention. As indicated in FIG. 19, in connection with a digital processing resource or other elements of receiving or transmitting device(s):

(1901. Originating environmental parameters can include parameters associated with the scene.)
(1902. Originating environmental parameters can include parameters associated with the transmitting device.)
(1903. Destination environmental parameters can include parameters associated with the environment proximate the receiving device.)
(1904. Destination environmental parameters can include parameters associated with the receiving device.)
(1905. Transmitting device can transmit originating environmental parameters to the receiving device, and the receiving device can utilize the originating environmental parameters in presenting the scene.)
(1906. Receiving device can transmit the destination environmental parameters to the transmitting device, and the transmitting device can utilize the destination environmental parameters in processing the first scene information to generate rich scene information.)
(1907. The environmental parameters can include an orientation vector.)
(1908. Orientation vector can be measured utilizing any of an accelerometer, gyroscope, compass, GPS (global positioning system), other spatial sensor, or combination of spatial sensors.)
(1909. An orientation vector can be substantially constrained with respect to a given device, but can be altered in response to a substantial change in data from a spatial sensor.)
(1910. Spatial sensor can include any of an accelerometer, gyroscope, compass, GPS, other spatial sensor, or combination of spatial sensors.)
(1911. An orientation vector is permitted to move to align with the orientation of an associated device in a gravity field.)
(1912. The digital processing resource is operable to apply a selected smoothing process to smooth high frequency changes to an orientation vector.)
(1913. Digital processing resource is operable to configure control logic to apply the selected smoothing process.)
(1914. An orientation vector can be at least in part controlled by a user through a user interface.)
(1915. The orientation vector can be derived from the rich scene information.)
(1916. In connection with the transmitting device: processing of scene information can include rotating or transforming the rich scene information with respect to an orientation vector.)
(1917. In connection with the receiving device: interpreting of scene information can include rotating or transforming the rich scene information with respect to an orientation vector.)
(1918. The interpreting or the processing can utilize orientation vectors from more than one device.)
(1919. The interpreting or the processing can utilize the difference between orientation vectors from more than one device.)
(1920. At least one transmitting or receiving device rotates or transforms the scene information, and the receiving device presents the scene with a consistent, defined downward orientation that is substantially aligned with a selected axis of the transmitting device or devices, irrespective of the rotation of the devices.)

FIG. 20 is a schematic block diagram showing aspects of display elements in accordance with exemplary embodiments and practices of the invention. As indicated in FIG. 20:

(2001. A receiving device is operable to present at least one image of the scene via a display element.)
(2002. A transmitting device is operable to generate feedback view that presents feedback to a user of the transmitting device.)
  (2002.1 Feedback can include an image of the scene.)
(2003. Display element can be a component of the transmitting device or the receiving device.)
(2004. Display element can be external to the transmitting device or the receiving device.)
(2005. Display element can include a head-mounted display (HMD).)
(2006. Display element can include a display screen on a hand-held device.)
(2007. Display element can include any of a desktop display screen, freestanding display screen, wall mounted display screen, surface mounted display screen or outdoor display screen.)

FIG. 21 is a schematic block diagram showing aspects of user controls and other controls and control interfaces enabled by or practiced in connection with the transmitting devices, receiving devices and processing resources in accordance with the present invention. As indicated in FIG. 21:

(2101. A receiving device operable to present a different portion of the scene from the portion presented by the feedback view of the transmitting device.)
(2102. A receiving device is operable to enable a user of the receiving device to select the portion of the scene presented by receiving device.)
(2103. Receiving device operable to enable user of receiving device to select a gaze direction to change a virtual viewpoint, thereby to control the viewpoint of the scene presented by the receiving device.)
(2104. Receiving device operable to enable user of receiving device to select a gaze direction by utilizing a touch screen interface associated with the receiving device.)
(2105. Gaze direction can be controlled at least in part by the output of an accelerometer, gyroscope, compass, GPS, other spatial sensor, or combination of spatial sensors.)
(2106. Receiving device operable to enable user of receiving device to control gaze direction by executing a user gesture observable by a non-contact sensor associated with the receiving device.)
(2107. Receiving device operable to enable gaze direction to be changed by the physical position of a user relative to a physical position of a receiving device.)
(2108. Receiving device operable to enable user of receiving device to change focus of a virtual camera that defines a perspective of a displayed image of the scene.)
  (2108.1. Focus can be changed by the user selecting a region of a displayed image to bring into sharp focus.)

(2108.2 A receiving device is operable to enable a user of the receiving device to change focus by executing a user gesture observable by a non-contact sensor associated with receiving device.)

(2109. Receiving device operable to enable user of receiving device to change field of view of displayed image.)

(2109.1 Receiving device operable to enable user of receiving device to change field of view by executing a gesture on a touch screen associated with the receiving device.)

(2109.2 Field of view can be changed by motion of device, the motion being detected by an accelerometer, gyroscope, compass, GPS, other spatial sensor, or combination of spatial sensors.)

(2109.3. Receiving device operable to enable user to change field of view by executing a gesture observable by a non-contact sensor associated with receiving device.)

(2109.4 Field of view can be changed by the physical position of a user, relative to the physical position of a receiving device.)

(2110. Receiving device is operable to enable user of receiving device to change an image zoom parameter.)

(2110.1 Receiving device operable to enable user of receiving device to change zoom parameter by executing a gesture on a touch screen associated with receiving device.)

(2110.2 A zoom parameter can be changed by motion of device, the motion being detected by an accelerometer, gyroscope, compass, GPS, other spatial sensor, or combination of spatial sensors.)

(2110.3 Receiving device is operable to enable user of receiving device to change zoom parameter by executing a gesture observable by non-contact sensor associated with receiving device.)

(2110.4 Zoom is controllable by the physical position of a user, relative to the physical position of a receiving device.)

FIG. 22 is a schematic block diagram showing other aspects of receiving device(s) and transmitting device(s) in accordance with exemplary embodiments and practices of the present invention. As indicated in FIG. 22:

(2201. Receiving device is operable to attempt to preserve the spatial topology of the scene captured by the transmitting device.)

(2202. A transmitting or receiving device is operable to apply a scale factor to the rich scene information.)

(2202.1. A transmitting or receiving device is operable to enable a user to modify the scale factor via a control interface.)

(2203. In a plurality of receiving devices and transmitting devices, at least one receiving device is operable to additionally function as a transmitting device, and at least one transmitting device is operable to additionally function as a receiving device.)

(2204. In a plurality of transmitting devices and receiving devices, some of the devices do not comprise the same sensors or capabilities as the other device or devices.)

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method for generating rich scene information representative of a scene, the method comprising:
in a digital processing resource comprising at least one digital processor:
(1) receiving data from at least two sensors, wherein at least two of the at least two sensors comprise a stereo pair of cameras, the received sensor data being at least in part representative of the scene;
(2) detecting reliability of the received sensor data, thereby generating reliability information, the reliability information being representative of the reliability of the data received from at least one sensor, wherein detecting reliability of the received sensor data comprises:
(a) comparing the output of a sensor to the output from at least one other sensor;
(b) performing stereo disparity analysis between at least two cameras, the stereo disparity analysis generating stereo disparity data; and
(c) wherein the comparing utilizes at least one histogram that pertains to stereo disparity data:
(3) remedying unreliable received sensor data to generate remedied data; and
(4) generating rich scene information representative of the scene and useable to reconstruct a view of the scene as viewed from a virtual viewpoint, wherein the generating of rich scene information utilizes (a) the received sensor data, (b) the remedied data and (c) the reliability information.

2. The method of claim 1 wherein the comparing further comprises:
(a) utilizing at least one histogram that pertains to depth data;
(b) generating an average:
(c) comparing luminance data from one or more cameras; and
(d) comparing color data from one or more cameras.

3. The method of claim 1 further comprising: determining whether a sensor is occluded.

4. The method of claim 1 wherein the remedying comprises notifying a user of unreliable data.

5. The method of claim 4 wherein the remedying comprises notifying a user, via a display, of unreliable data.

6. The method of claim 1 wherein at least one sensor is associated with a device containing the at least one sensor and a display, and the remedying comprises notifying the user, via the display, of unreliable data.

7. The method of claim 4 wherein the remedying comprises: presenting, to the user, intuitive visual cues via the display, the intuitive visual cues being configured so as to tend to direct the user to act in a manner to resolve a condition causing unreliable data.

8. The method of claim 7 wherein the intuitive visual cues are applied via the display, to a region of an image of the scene, the region being associated with the unreliable data.

9. The method of claim 7 wherein the intuitive visual cues comprise a visual effect.

10. The method of claim 9 wherein the visual effect is applied more strongly in response to greater unreliability.

11. The method of claim 9 wherein the visual effect comprises a blur effect.

12. The method of claim 1 wherein at least one sensor is associated with a capturing device, and further comprising:

transmitting the rich scene information to a remote device, the remote device being a device remote from the scene and operable to receive transmitted rich scene information.

13. The method of claim 12 wherein the indication of unreliable data presented by the capturing device is configured so as to tend to direct a user of the capturing device to remedy an occluded sensor.

14. The method of claim 1 wherein the rich scene information comprises depth information.

15. A non-transitory digital processor-readable medium useable in a digital processing system, the digital processing system comprising a digital processing resource comprising at least one digital processor, the digital processing resource being operable to communicate with at least two sensors operable to (i) generate sensor data in response to sensed conditions and (ii) communicate the sensor data to the digital processing resource, wherein at least two of the at least two sensors comprise a stereo pair of cameras, the digital processor-readable medium comprising digital processor-executable program instructions, which, when executed in the digital processing resource, cause the digital processing resource to:
  (1) receive sensor data from at least two sensors, the received sensor data being at least in part representative of a scene;
  (2) detect reliability of the received sensor data, thereby generating reliability information, the reliability information being representative of the reliability of the data received from at least one sensor, wherein detecting reliability of the received sensor data comprises:
    (a) comparing the output of a sensor to the output from at least one other sensor;
    (b) performing stereo disparity analysis between at least two cameras, the stereo disparity analysis generating stereo disparity data; and
    (c) wherein the comparing utilizes at least one histogram that pertains to stereo disparity data;
  (3) remedy unreliable received sensor data to generate remedied data; and
  (4) generate rich scene information representative of the scene and useable to reconstruct a view of the scene as viewed from a virtual viewpoint, wherein the generating of rich scene information utilizes (a) the received sensor data, (b) the remedied data and (c) the reliability information.

16. A system for generating rich scene information representative of a scene, the system comprising:
  (A) a digital processing resource comprising at least one digital processor; and
  (B) at least two sensors operable to generate sensor data in response to sensed conditions and to communicate the sensor data to the digital processing resource, wherein at least two of the at least two sensors comprise a stereo pair of cameras;
  the digital processing resource being configured to:
  (1) receive sensor data from at least two sensors, the received sensor data being at least in part representative of the scene;
  (2) detect reliability of the received sensor data, thereby generating reliability information, the reliability information being representative of the reliability of the data received from at least one sensor, wherein detecting reliability of the received sensor data comprises:
    (a) comparing the output of a sensor to the output from at least one other sensor;
    (b) performing stereo disparity analysis between at least two cameras, the stereo disparity analysis generating stereo disparity data; and
    (c) wherein the comparing utilizes at least one histogram that pertains to stereo disparity data:
  (3) remedy unreliable received sensor data to generate remedied data; and
  (4) generate rich scene information representative of the scene and useable to reconstruct a view of the scene as viewed from a virtual viewpoint, wherein the generating of rich scene information utilizes (a) the received sensor data, (b) the remedied data and (c) the reliability information.

\* \* \* \* \*